US012105031B2

United States Patent
Abutaroush et al.

(10) Patent No.: US 12,105,031 B2
(45) Date of Patent: Oct. 1, 2024

(54) DIFFERENTIAL DIELECTRIC CONSTANT SENSING SYSTEM AND METHOD

(71) Applicant: Taibah University, Medina (SA)

(72) Inventors: Hattan F. Abutarboush, Madinah (SA); Muhammad Amin, Madinah (SA); Rashad Ramzan, Islamabad (PK); Omar F. Siddiqui, Madinah (SA); Daniyal Ali Sehrai, Peshawar (PK); Raghied H. Atta, Madinah (SA)

(73) Assignee: Taibah University, Medina (SA)

( * ) Notice: Subject to any disclaimer, the term of this patent is extended or adjusted under 35 U.S.C. 154(b) by 133 days.

(21) Appl. No.: 18/164,496

(22) Filed: Feb. 3, 2023

(65) Prior Publication Data
US 2024/0264093 A1    Aug. 8, 2024

(51) Int. Cl.
G01N 22/00    (2006.01)
(52) U.S. Cl.
CPC ..................... *G01N 22/00* (2013.01)
(58) Field of Classification Search
CPC .......... G01N 22/00; G01N 22/04; H03B 7/08; H03B 7/14; H01P 1/20381; H01P 7/082; H01P 7/084; H01P 1/2039; H01P 7/08
See application file for complete search history.

(56) References Cited

U.S. PATENT DOCUMENTS

| 7,561,004 B1* | 7/2009 | Tsironis | H01P 1/202 333/263 |
| 7,564,244 B2* | 7/2009 | Freytag | H01Q 7/005 324/309 |
| 10,186,743 B2 | 1/2019 | Ramzan et al. | |
| 10,186,744 B2 | 1/2019 | Ramzan et al. | |
| 11,791,532 B1* | 10/2023 | Moore | H03B 5/1817 333/232 |
| 2003/0222732 A1* | 12/2003 | Matthaei | H01P 1/20381 333/204 |
| 2018/0219531 A1* | 8/2018 | Ramzan | H01P 7/082 |

OTHER PUBLICATIONS

Amin et al., "Slow Wave Applications of Electromagnetically Induced Transparency in Microstrip Resonator," Scientific Reportsm vol. 8, Article No. 2357 (2018). (13 pages).
(Continued)

*Primary Examiner* — Alvaro E Fortich
(74) *Attorney, Agent, or Firm* — MUGHAL GAUDRY & FRANKLIN PC

(57) ABSTRACT

Described herein is Dielectric Constant Sensor (DDKS) comprising an EIT-based with two U-shaped structures and a transmission line that can compare dielectric constants (Dks) of two different materials that are placed at open stubs U-shaped structures. In at least one embodiment, DDKS generates fully tuned EIT resonance when a reference sample and a sample under test (SUT) have the same Dk. In at least one embodiment, a sharp resonant split is observed within EIT resonance band when a reference sample and sample under test have different Dks. In at least one embodiment, Dk sensor can detect biomarkers of infectious diseases in blood, urine, saliva, medicines, or any other biological sample.

20 Claims, 18 Drawing Sheets

Differential Dielectric Constant Sensing System (DDkSS)

(56) References Cited

OTHER PUBLICATIONS

Jabbar et al., "Wave discrimination at C-band frequencies in microstrip structures inspired by electromagnetically induced transparency," Scientific Reports, vol. 11, Article No. 2983 (2021). (11 pages.
Jain et al., "Differential Microwave Resonator Sensor Reveals Glucose-Dependent Growth Profile of E. coli on Solid Agar," IEEE Microwave and Wireless Components Letters, vol. 30, No. 5, May 2020 (4 pages).
Mohammadi et al., "A Label-Free, Non-Intrusive, and Rapid Monitoring of Bacterial Growth on Solid Medium Using Microwave Biosensor," IEEE Transactions on Biomedical Circuits and Systems, vol. 14, No. 1, Feb. 2020 (10 pages).
Mohammadi et al., "Differential Microwave Resonator Sensor for Real-Time Monitoring of Volatile Organic Compounds," IEEE Sensors Journal, vol. 21, No. 5, Mar. 1, 2021 (10 pages).
Siddiqui et al., "An Ultra-Sensitive Lorentz Microwave Sensor for Detection of Low-Permittivity Gaseous WaterStates and Sub-Wavelength Biosamples," IEEE Sensors Journal, vol. 21, No. 22, Nov. 15, 2021 (9 pages).
Zhang et al., "Highly sensitive detection of malignant glioma cells using metamaterial-inspired THz biosensor based on electromagnetically induced transparency," Biosensors and Bioelectronics 185 (2021) 113241. (7 pages).

\* cited by examiner

DIFFERENTIAL DIELECTRIC CONSTANT SENSING SYSTEM AND METHOD

TECHNICAL FIELD

At least one embodiment is generally related to electronic sensing of one of more dielectric constants, and more particularly related to calibration-less sensing of dielectric constant.

BACKGROUND

In a world where rapid spread of bacterial and viral diseases leads to frequent pandemics, there is a need for efficient, portable, compact, and simple sensors that can quickly detect signatures of bacterial and viral diseases. A family of radio-frequency (RF) based sensors that measure Dk to characterize biomaterials, such as blood samples, urine, medicines, etc., have been used. These RF-based sensors are large, have low sensitivity, consume higher power, entail high manufacturing cost, and require periodic calibration to maintain accuracy.

The background description provided here is for the purpose of generally presenting the context of the disclosure. Unless otherwise indicated here, the material described in this section is not prior art to the claims in this application and are not admitted to be prior art by inclusion in this section.

BRIEF DESCRIPTION OF THE DRAWINGS

At least one embodiment may be understood more fully from detailed description given below and from accompanying drawings, which, however, should not be taken to be limiting, but are for explanation and understanding.

DETAILED DESCRIPTION

In at least one embodiment, a Differential Dielectric Constant Sensing System (DDkSS) comprises a Differential Dielectric Constant Sensor (DDKS) and related circuits. In at least one embodiment, DDKS may be based on Electromagnetically Induced Transparency (EIT) resonance based dielectric constant (Dk) comparator comprising two resonator structures (e.g., U-shaped resonator structures) and a transmission line circuit that can characterize a dielectric material by comparing two samples having different Dks, wherein a first sample is a reference sample and a second sample is a Sample-Under-Test (SUT). In at least one embodiment, DDkSS allows for detection of infection biomarkers in solid, semi-solid, and liquid samples (e.g., bones, tumors, blood, urine, saliva, tears, and aqueous ethanol solutions). In at least one embodiment, DDkSS can also be used for characterization of industrial dielectric materials.

In at least one embodiment, DDKS can compare Dk in minuscule quantity of samples (e.g., in the order of few microliters) with Dk of reference sample. In at least one embodiment, DDKS can compare Dk of a reference sample with a SUT. As such, changes in Dk due to a variation in temperature are canceled because of differential sensing; therefore, calibration of sensors of system may not be used, which makes DDkSS accurate, low power, and provider of real time detection.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction, and may be implemented with any suitable type of signal scheme.

It is pointed out that those elements of the figures having the same reference numbers (or names) as the elements of any other figure can operate or function in any manner like that described but are not limited to such.

Figure 1A:
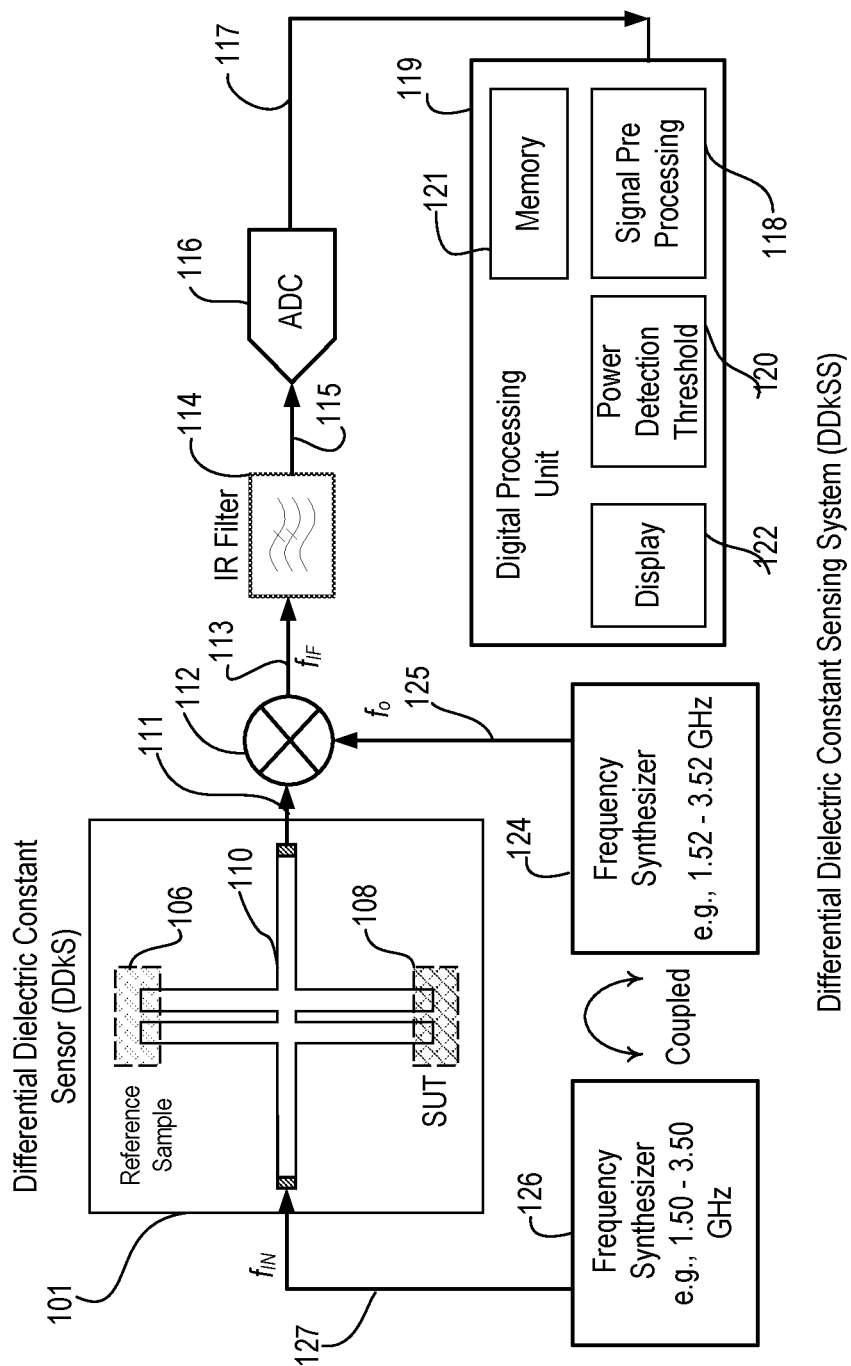
FIG. 1A illustrates a block diagram of a Differential Dielectric Constant Sensing System (DDkSS) and associated minimal electronics, in accordance with at least one embodiment.

FIG. 1A illustrates a block diagram of DDKSS 100 and associated electronics, in accordance with at least one embodiment. In at least one embodiment, DDKSS 100 comprises a double U-shaped DDKS 101, mixer 112, Image Reject (IR) filter 114, ADC 116, digital processing unit 119, a first frequency synthesizer 124, and a second frequency synthesizer 126. In at least one embodiment, digital processing unit 119 comprises signal pre-processing block 118, power detection and threshold block 120, memory 121, and display unit 122.

In at least one embodiment, DDkSS 100 determines whether a Dk value of a SUT is same compared with that of a reference sample. In at least one embodiment, first frequency synthesizer 124 generates oscillator signal $f_O$ 125 in a first frequency range (e.g., 1.52 GHz to 3.52 GHz). In at least one embodiment, second frequency synthesizer 126 generates input frequency signal $f_{IN}$ 127 for double U-shaped DDKS 101 in a second frequency range (e.g., 1.5 GHz to 3.5 GHZ). In at least one embodiment, second frequency range may also contain frequency points at which Dk sensing is desired. In at least one embodiment, physical size of U-shaped resonator stubs of double U-shaped DDKS 101 is inversely proportional to frequency at which EIT split occurs, in turn this frequency may be within a range (e.g., 1.52 GHz to 3.52 GHZ) of first frequencies synthesizer 124.

In at least one embodiment, U-shaped resonator DDKS 101 compares Dk of SUT 108 with that of a reference sample 106. In at least one embodiment, output signal 111 is generated from U-shaped resonator DDKS. In at least one embodiment, output signal 111 may be an attenuated and phase-shifted form of input signal $f_{IN}$ 127. In at least one embodiment, output signal 111 passes through transmission line 110 and is fed to mixer 112.

In at least one embodiment, mixer 112 takes an RF signal from DDKS 101 and oscillator signal $f_O$ 125 from first frequency synthesizer 124 as an input. In at least one embodiment, first frequency synthesizer 124 and second frequency synthesizer 126 are coupled electrically or magnetically or by any other means like fractional N synthesizers to produce a signal with a fixed offset (e.g., 20 MHz). In at least one embodiment, any offset frequency can be selected, but it may be be half of an ADC sampling frequency to meet Nyquist sampling criteria. In at least one embodiment, mixer 112 produces an intermediate frequency signal $f_{IF}$ 113 which comprises a sum and difference of input frequencies, and can be expressed as $f_{IF}=f_{IN}\pm fo$. In at least one embodiment, high frequency component of intermediate frequency signal $f_{IF}$ 113 is filtered by IR filter 114 which produces low frequency analog signal 115. In at least one embodiment, signal 115 has same frequency as that of offset between oscillator signal $f_O$ 125 and input signal $f_{IN}$ 127 from first frequency synthesizer 124 and second frequency synthesizer 126, respectively.

In at least one embodiment, low frequency analog signal 115 (e.g., 20 MHz) may be converted to a digital signal using Analog to Digital Converter (ADC) 116 which produces digital signal 117. In at least one embodiment, ADC 116 converts continuous physical quantities (e.g., voltages) to digital numbers that represent the amplitude of the physical quantities. In at least one embodiment, ADC 116 is one of: direct-conversion ADC (for flash ADC), two-step flash ADC, successive-approximation ADC (SAR ADC), ramp-compare ADC, Wilkinson ADC, integrating ADC, delta-encoded ADC or counter-ramp, pipeline ADC (also called subranging quantizer), sigma-delta ADC (also known as a delta-sigma ADC), time-interleaved ADC, ADC with intermediate FM stage, or time-stretch ADC. In at least one embodiment, sampling frequency of ADC 116 may be substantially twice a frequency of low frequency analog signal 115, thus meeting Nyquist sampling criteria. In at least one embodiment, sampling frequency of ADC 116 may be 40 MS/s which is twice a frequency of 20 MHz low frequency analog signal 115. In at least one embodiment, output of ADC 116 is provided to digital processing unit 119 for further processing.

In at least one embodiment, digital signal 117 may be processed in digital preprocessing unit 118 which may be programmed to execute mathematical methods such as sub-sampling, antialiasing, filtering, and/or averaging. In at least one embodiment, digital preprocessing block 118 can be a Digital Signal Processor (DSP), an Application Specific Integrated Circuit (ASIC), a general-purpose Central Processing Unit (CPU), Graphics Processor Unit (GPU), or a low power logic implementing a finite state machine to perform the method of various embodiments, etc.

In at least one embodiment, memory 121 stores processed data in a format used by disclosed differential Dk sensing method. In at least one embodiment, memory 121 can include nonvolatile memory (state does not change if power to the memory device is interrupted) and/or volatile memory (state is indeterminate if power to the memory device is interrupted). In at least one embodiment, examples of nonvolatile memory include flash memory, magnetic memory, resistive memory, ferroelectric memory, etc. In at least one embodiment, examples of volatile memory include static random-access memory, dynamic random-access memory, etc. In at least one embodiment, memory 121 can store processed data (whether long-term or temporary) related to the execution of applications and functions of DDkSS 100.

In at least one embodiment, memory 121 comprises a machine-readable media for storing computer-executable instructions (e.g., instructions to implement any other processes discussed herein). In at least one embodiment, machine-readable medium may include, but is not limited to, flash memory, optical disks, CD-ROMs, DVD ROMs, RAMS, EPROMs, EEPROMs, magnetic or optical cards, phase change memory (PCM), or other types of machine-readable media suitable for storing electronic or computer-executable instructions. At least one embodiment may be downloaded as a computer program (e.g., BIOS) which may be transferred from a remote computer (e.g., a server) to a requesting computer (e.g., a client) by way of data signals via a communication link (e.g., a modem or network connection).

In at least on embodiment, power detection and threshold block 120 detects a signal when it crosses a certain predefined threshold to find a magnitude of an EIT split. In at least one embodiment, results are reported in a graph format on display unit 122.

Figure 1B:
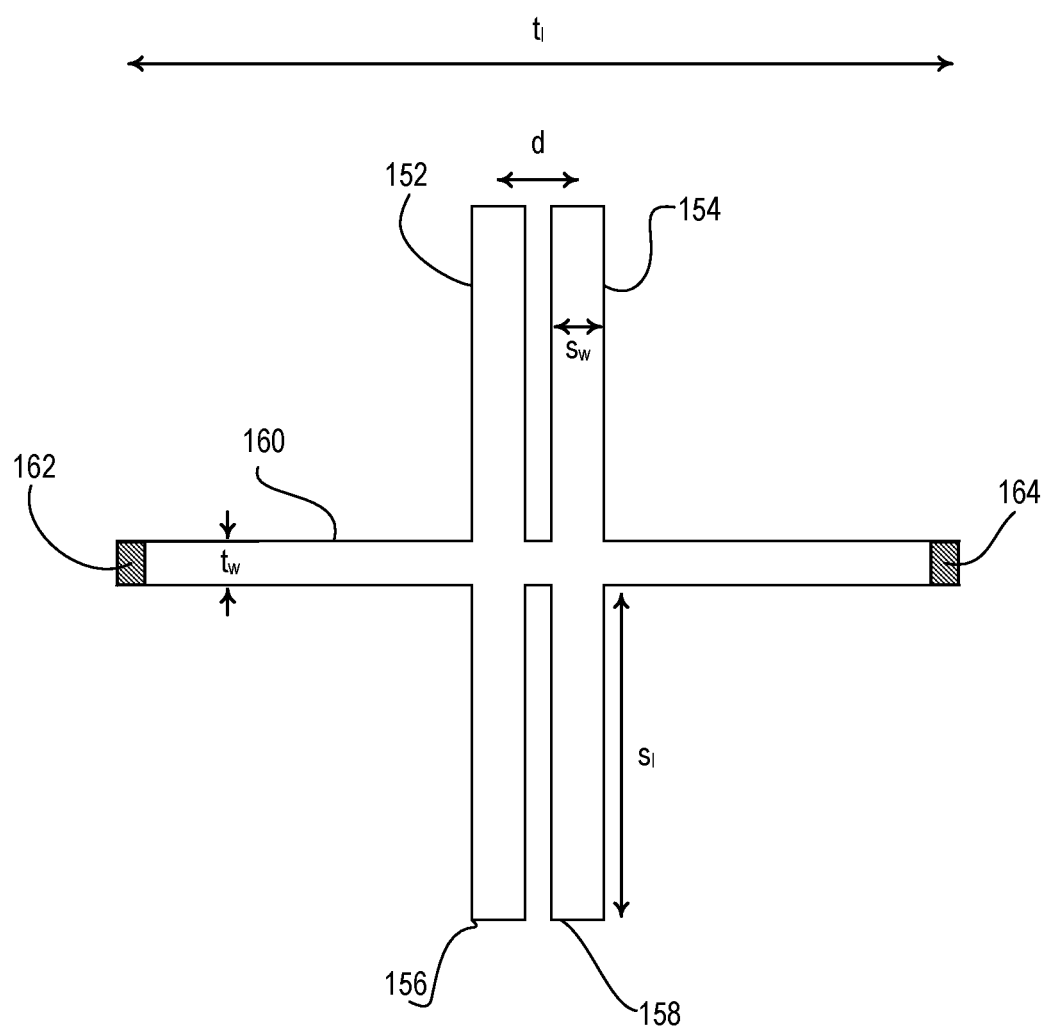
FIG. 1B illustrates a structure of a Differential Dielectric Constant Sensor (DDkS), in accordance with at least one embodiment.

FIG. 1B illustrates structure 150 of DDKS 101, in accordance with at least one embodiment. In at least one embodiment, DDKS 101 comprises a transmission line with two U-shaped resonators; and individual one of them comprises two symmetric and rectangular-shaped body sections with an equal width and length on the opposite sides of a transmission line. In at least one embodiment, structure 150 is a U-shared structure comprising of main transmission line 160 with four open stubs 152, 154, 156, and 158, and two matched RF ports 162 and 164. In at least one embodiment, stubs 152, 154, connected to the upper side of transmission line 160, form a first U-shaped resonator structure and stubs 156, 158, connected to the lower side of transmission line 160, form a second U-shaped resonator structure. In at least one embodiment, two U shape structures comprising four stubs 152, 154, 156, and 158 when connected to opposite sides of transmission line 160, but substantially at its center or middle point, makes a sensor.

In at least one embodiment, U-shaped resonator based DDKS structure 150 may be implemented as a microstrip structure on a printed circuit board (PCB) at any scale depending on an operating frequency range. In at least one embodiment, design parameters of structure 150 include PCBs' dielectric material, transmission line length $t_l$, transmission line width $t_w$, stub length $s_l$, stub width $s_w$, and distance between stubs d. In at least one embodiment, four open stubs 152, 154, 156, and 158 are arranged across transmission line 160 in two pairs. In at least one embodiment, first pair comprises stubs 152 and 154 on one side of transmission line 160. In at least one embodiment, second pair comprises stubs 156 and 158 on an opposite side of transmission line 160. In at least one embodiment, since length and width of stubs and distance between two stubs are same in both U-shaped resonator pairs, they resonate at a same frequency and produce an EIT resonance at that frequency. In at least one embodiment, interference between two stubs in U-shape structure supports EIT resonance with a high-quality factor. In at least one embodiment, at resonance, a strong electric field exits at open edges of stubs which is then used for Dk sensing. In at least one embodiment, samples can be placed at edges of four open stubs 152, 154, 156, and 158.

Figure 2:
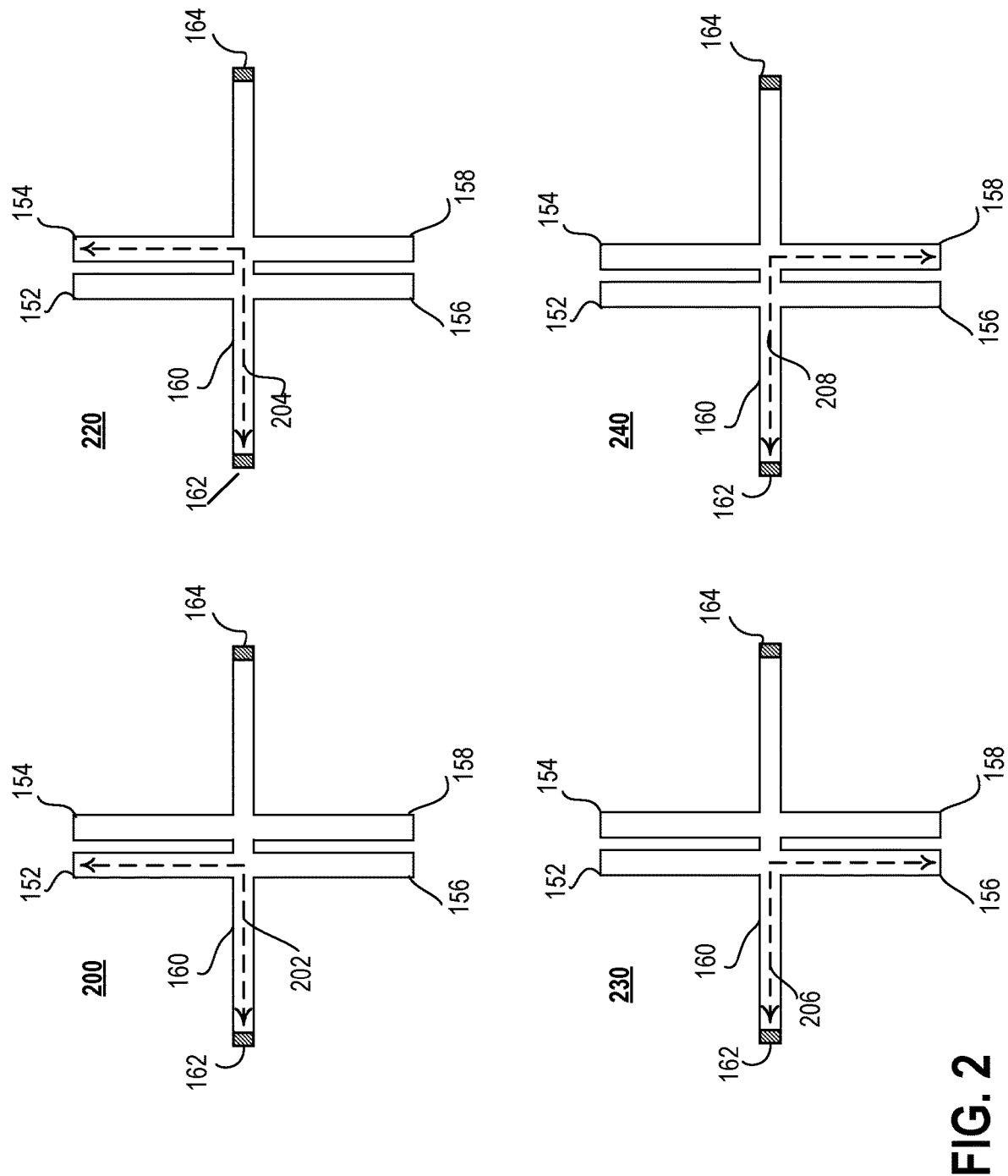
FIG. 2 illustrates four different lengths which determine resonance frequencies of open stubs of U-shaped resonators of DDKS, in accordance with at least one embodiment.

FIG. 2 illustrates four configurations 200, 220, 230, and 240, respectively representing different lengths 202, 204, 206, and 208 which determine resonance frequencies of open stubs of U-shaped resonators of DDKS, in accordance with at least one embodiment. In at least one embodiment, four electrical lengths 202, 204, 206, and 208 utilize part of U-shaped resonator structure and transmission line 160 of FIG. 1A. In at least one embodiment, electrical lengths determine resonance frequencies of open-ended stubs 152, 154, 156, and 158. In at least one embodiment, stub 152 resonates at a frequency at which electrical distance 202 becomes one-fourth of wavelength. In at least one embodiment, stubs 154, 156, and 158 resonate at frequencies at which electrical distances 204, 206, and 208 become one-fourth of wavelength, respectively. In at least one embodiment, electrical lengths are a function of an operating frequency band. In at least one embodiment, a small distance d between two stubs makes resonant stubs in a pair to constructively interfere in EIT band. In at least one embodiment, since both stub pairs have identical dimension, their individual EIT resonance have same shape of transmittance plot as that of combined transmittance plot because of U-shape structures.

Figure 3:
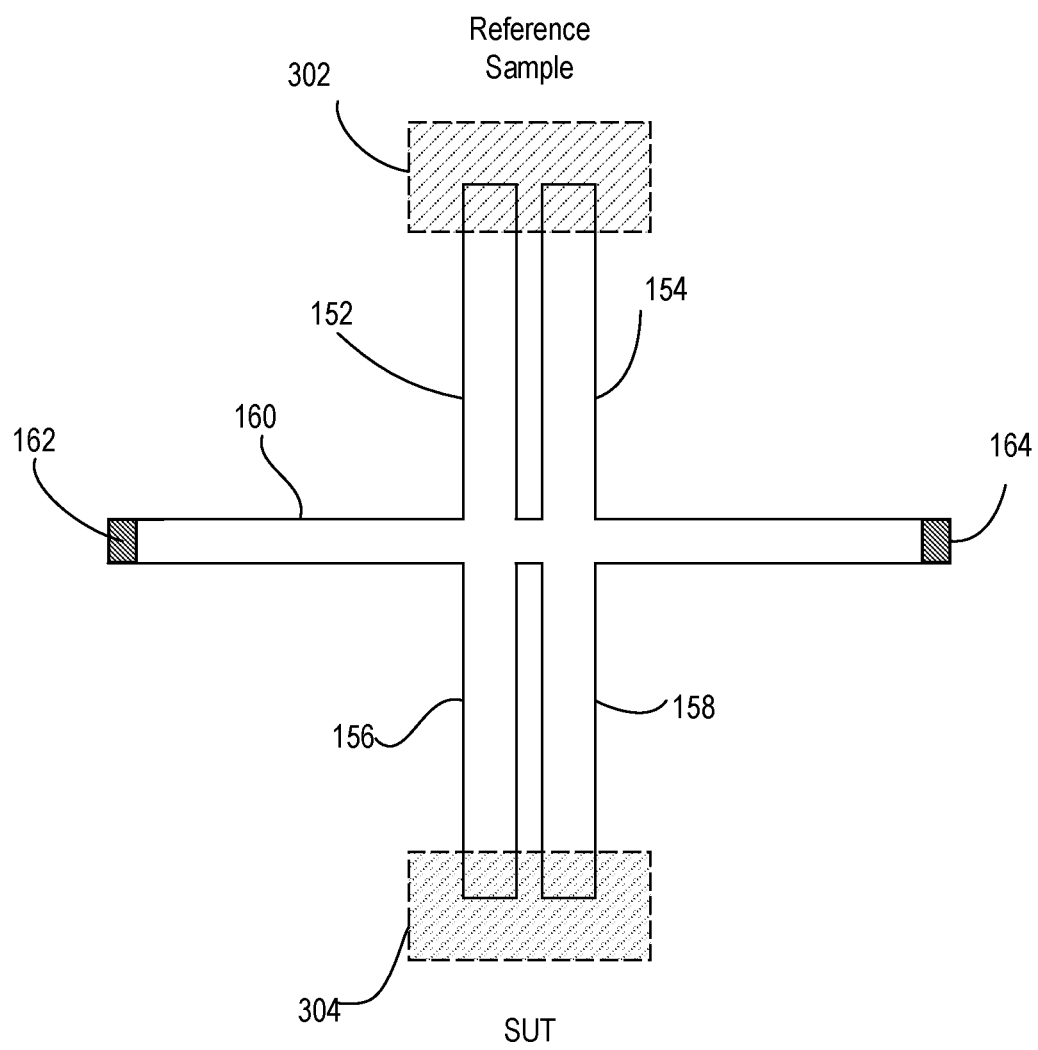
FIG. 3 illustrates an embodiment wherein a reference sample and a Sample-Under-Test (SUT) is placed on open stubs of two U-shaped resonators, respectively, in accordance with at least one embodiment.

FIG. 3 illustrates DDKS 300 where a reference sample and a SUT is placed on open stubs of two U-shaped resonators, respectively, in accordance with at least one embodiment. FIG. 3 shows location where two samples may be placed on DDKS 300 in accordance with at least one embodiment. In at least one embodiment, a reference sample may be placed on U-shaped resonator structure at 302 on top of stubs 152 and 154, and a SUT may be placed at 304 on top of stubs 156 and 158. In at least one embodiment, samples may be placed at open end of stubs where electric field distribution is strongest. In at least one embodiment, two samples placed on top of stubs changes distribution of dielectric field based on value of their respective Dk values. In at least one embodiment, when Dk values of two samples are same, a fully tuned EIT resonance occurs which shows that a SUT has same Dk as that of a reference sample. Otherwise, in at least one embodiment, if Dks of two samples are different, a strong split appears in EIT band due to destructive interference of electric fields. In at least one embodiment, in case of a biological sample, split indicates that a SUT contains infection biomarkers that has changed its dielectric properties. In at least one embodiment, EIT resonance has a high-quality factor compared to that of a simple LC resonance that makes any changes in Dk easily distinguishable when using EIT resonance. In at least one embodiment, DDKS is compact and may not include power dividers or couplers. In at least one embodiment, high sensitivity of DDKS enables it to detect disorders in blood, urine, or any other biological samples. In at least one embodiment, since Dks of two materials are compared based on an existence of spilt in an EIT resonance, visual inspection of a resonance curve can reveal results without complex data processing on recorded s21 parameter. In at least one embodiment, DDKS may not need calibration. As such, in at least one embodiment, DDKS may be cost-effective and easier to use in field.

Figure 4A:
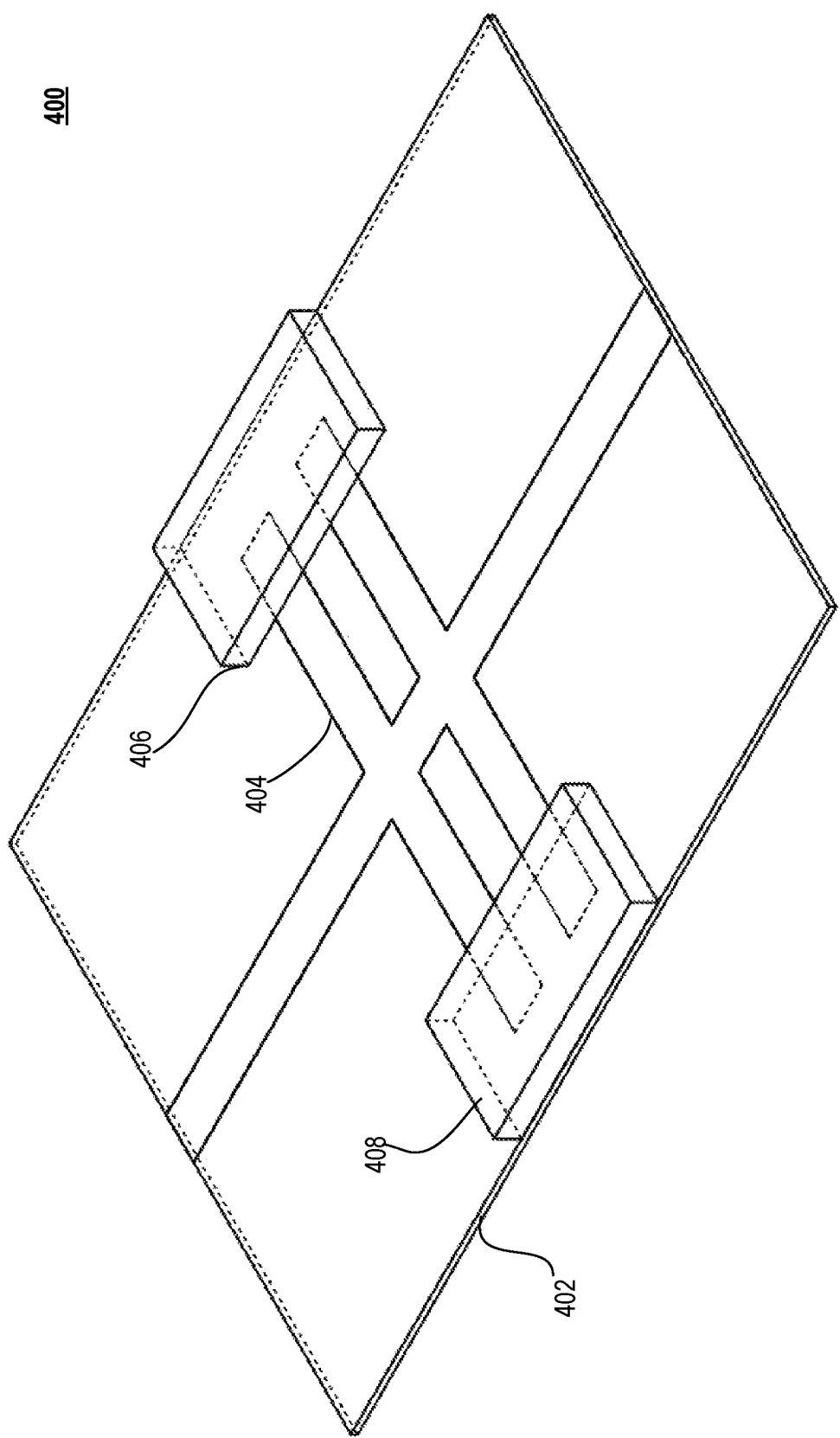
FIG. 4A illustrates a 3D view of a DDkS, in accordance with at least one embodiment.

FIG. 4A illustrates a 3D view of DDKS 400, in accordance with at least one embodiment. In at least one embodiment, DDKS 400 comprises PCB dielectric 402, U-shaped resonator structure 404, which is etched on a metal layer (e.g., copper layer), and a pair of glass containers 406 and 408 that hold both samples (e.g., a reference sample and a SUT). In at least one embodiment, both containers are placed on open stubs of U-shaped resonator structures.

Figure 4B:
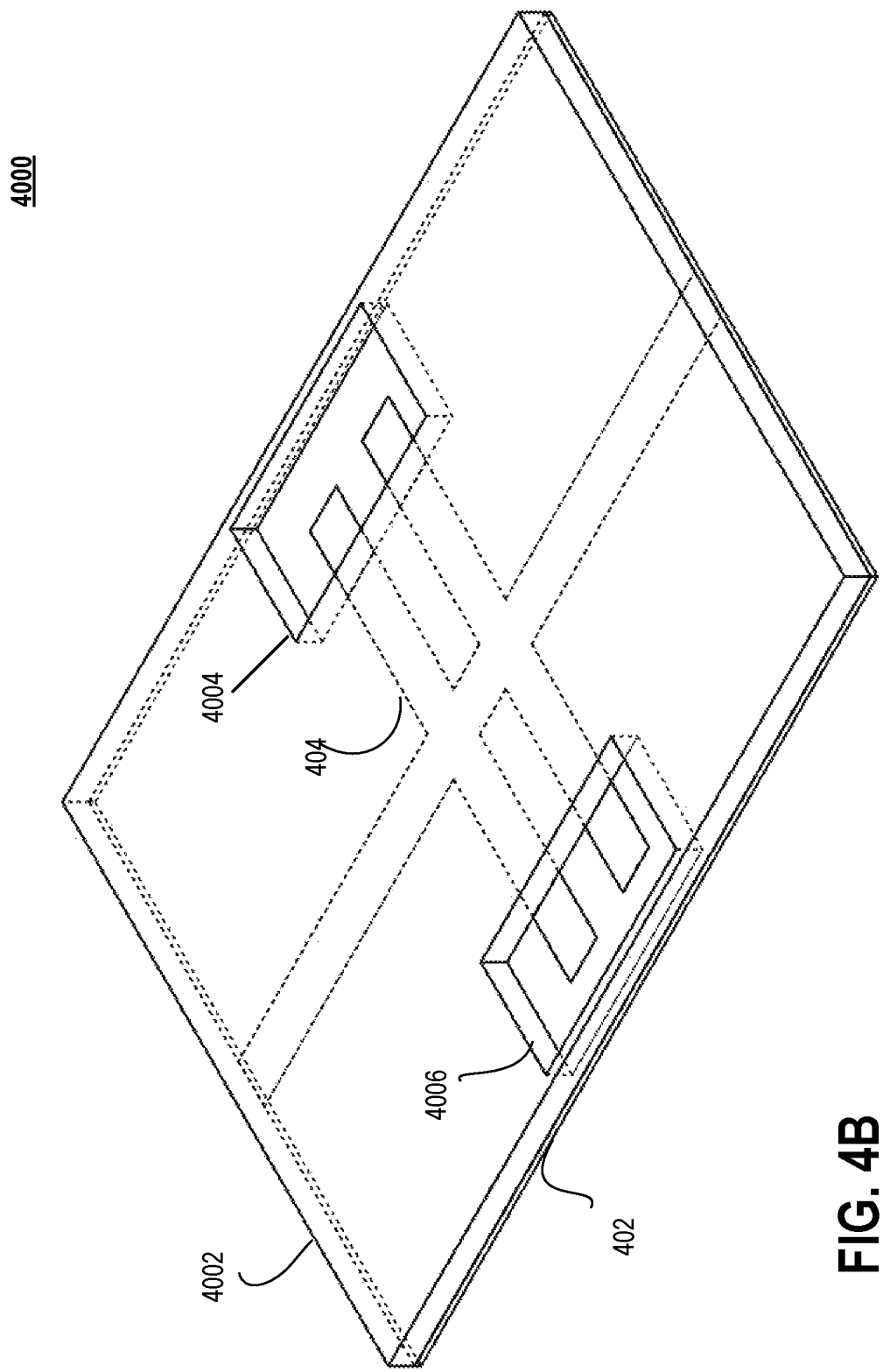
FIG. 4B illustrates a 3D view of a DDkS, in accordance with at least one embodiment.

FIG. 4B illustrates a 3D view of a DDKS 4000, in accordance with at least one embodiment. In at least one embodiment, open stubs of U-shaped resonator are covered with a thin layer of insulator; and a glass sheet with cavities is placed on top of this insulator that may contain solid samples. In at least one embodiment, glass sheet 4002 is placed on top of U-shaped resonator structure 404. In at least one embodiment, glass sheet 4002 has two cavities 4004 and 4006 that contain a reference solid sample and a SUT, respectively. In at least one embodiment, a thin sheet of an insulator, such as a thin glass or some non-reactive polymer, may be placed on top of stubs of a DDKS 4000 to prevent any direct contact with samples. In at least one embodiment, glass sheet 4002 ensures that two samples do not short open stubs.

Figure 4C:
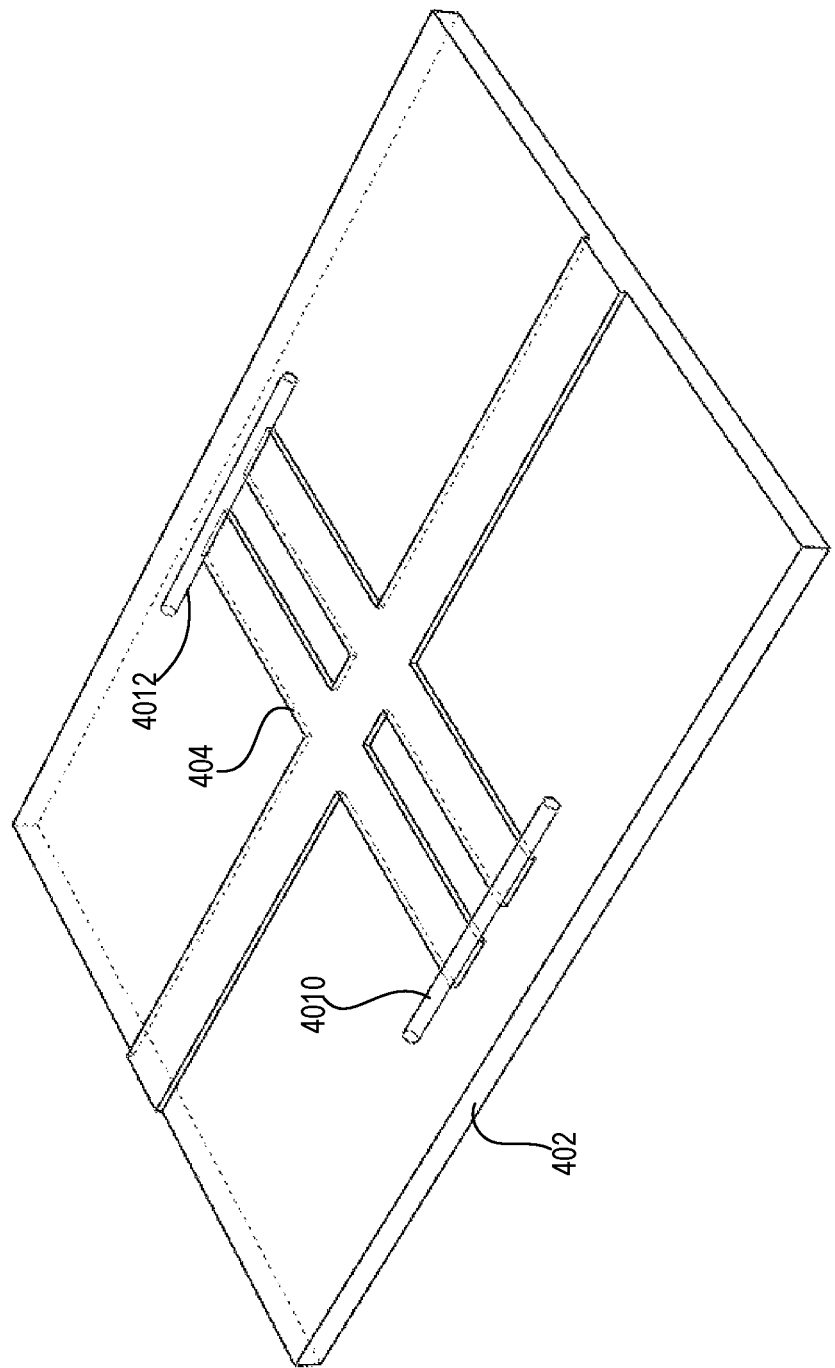
FIG. 4C illustrates a 3D view of a DDkS, in accordance with at least one embodiment.

FIG. 4C illustrates a 3D view of a DDKS 4100, in accordance with at least one embodiment. In at least one embodiment, open stubs of U-shaped resonator are covered with a pair of capillary tubes to hold minuscule quantity of liquid samples for spontaneous/instant or real-time microfluidic sensing. In at least one embodiment, capillary tubes 4010 and 4012 are placed on top of U-shaped resonator structure 404. In at least one embodiment, capillary tubes 4010 and 4012 are used to hold minuscule quantity of microfluidics for spontaneous/instantaneous or real-time sensing.

Figure 5:
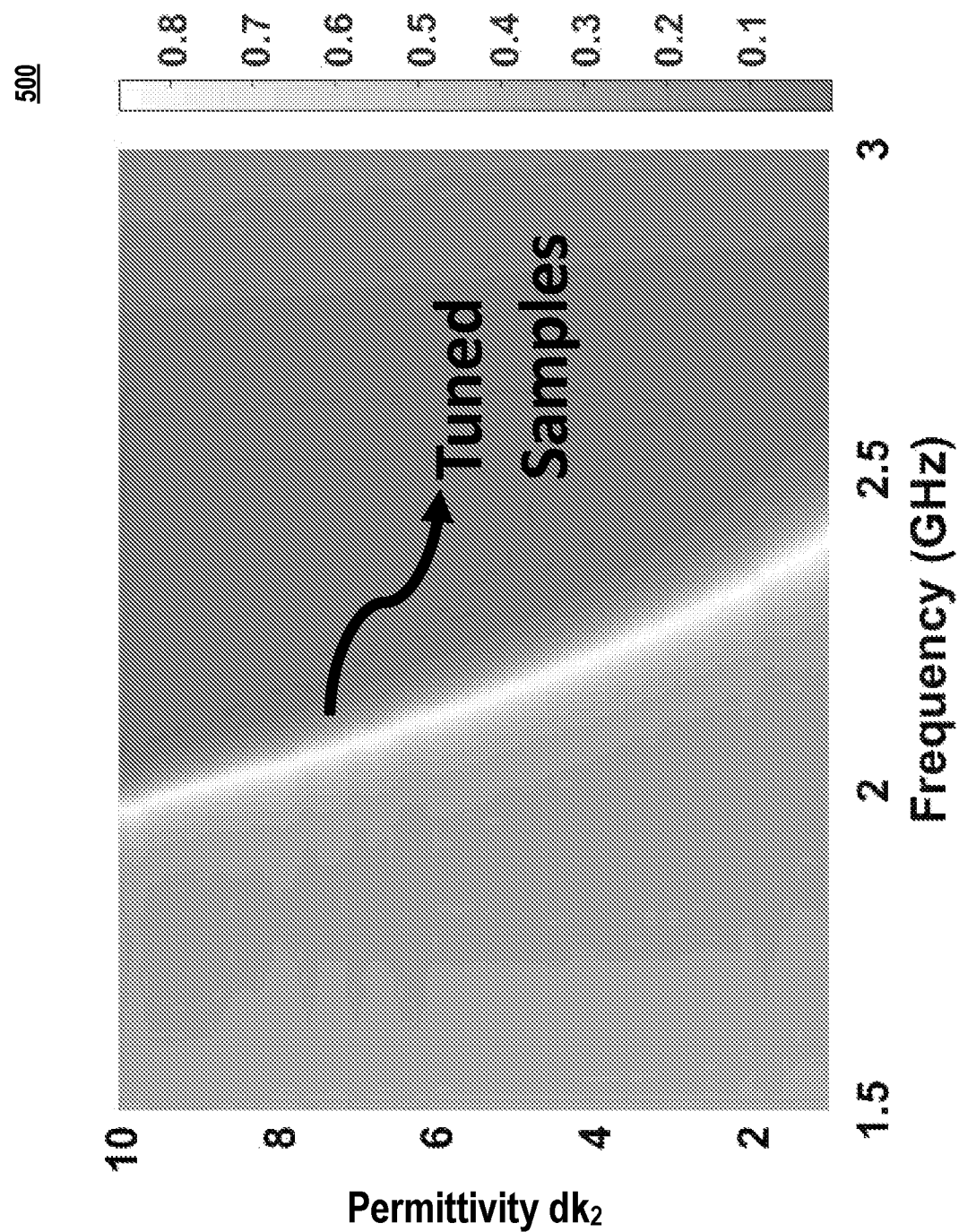
FIG. 5 illustrates a plot showing simulation results for a transmitted field (S21) spectrum because of variations in dielectric constant (Dk) when both samples are the same, in accordance with at least one embodiment.

FIG. 5 illustrates plot 500 showing simulation results for a transmitted field (S21) spectrum because of variations in dielectric constant (Dk) when both samples are the same, in accordance with at least one embodiment. Here, high/low transmittance in dB is shown on a gray scale in which x-axis shows frequency and y-axis Dk of a sample. Plot 500 is a field plot of a DDKS when both samples have same Dk, in accordance with at least one embodiment. In this example, resonance response from both samples and stub pairs are identical. In at least one embodiment, frequency of resonance depends on values of Dk (dielectric constant) of two samples as indicated by plot 500. In at least one embodiment, resonance frequency decreases with an increase in Dk of materials.

Figure 6:
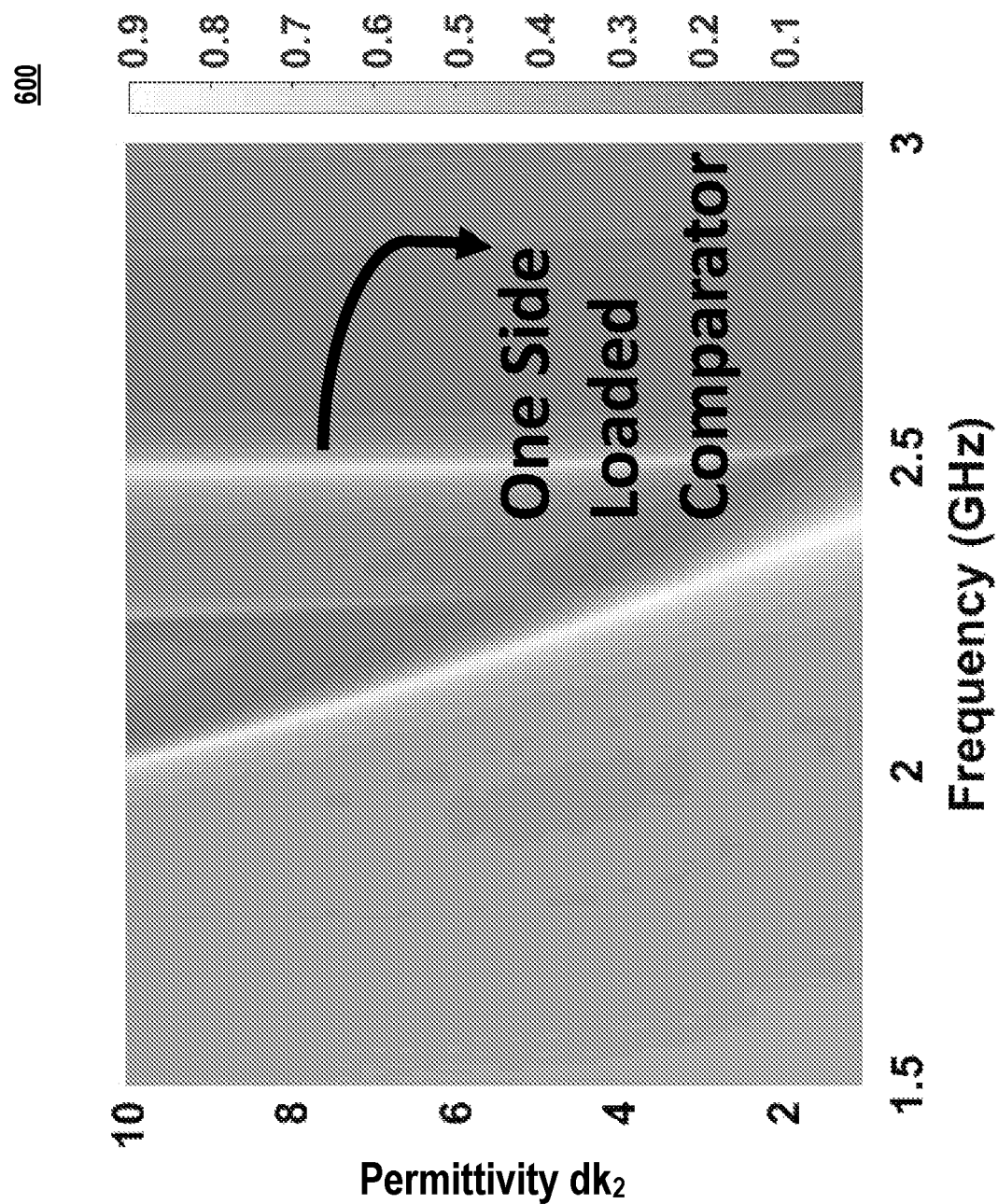
FIG. 6 illustrates simulation results for a transmitted field (S21) spectrum because of variations in Dk when a first side is loaded with a sample and a second side is exposed to the air, in accordance with at least one embodiment.

FIG. 6 illustrates plot 600 showing simulation results for a transmitted field (S21) spectrum because of variations in Dk when a first side is loaded with a sample and a second side is exposed to the air, in accordance with at least one embodiment. Here, high/low transmittance in dB is shown in FIG. 6 on a white/black color scale, respectively. Plot 600 illustrates a case when one sample is loaded on a first side of U-shaped resonator structure and a second side of U-shaped resonator structure is exposed to open air; consequently, a mismatch results in resonant responses, supported by stub pairs, of two U-shaped resonator structures. This results in a split in the EIT resonance band that gets wider with an increase in the Dk value of a loaded sample, in accordance with at least one embodiment. Plot 600 is a transmitted field plot which shows that EIT band shifts to a lower frequency for loaded stub pair as Dk is increased; while EIT band remains unchanged for second side (e.g., unloaded stub pair), in accordance with at least one embodiment.

Figure 7:
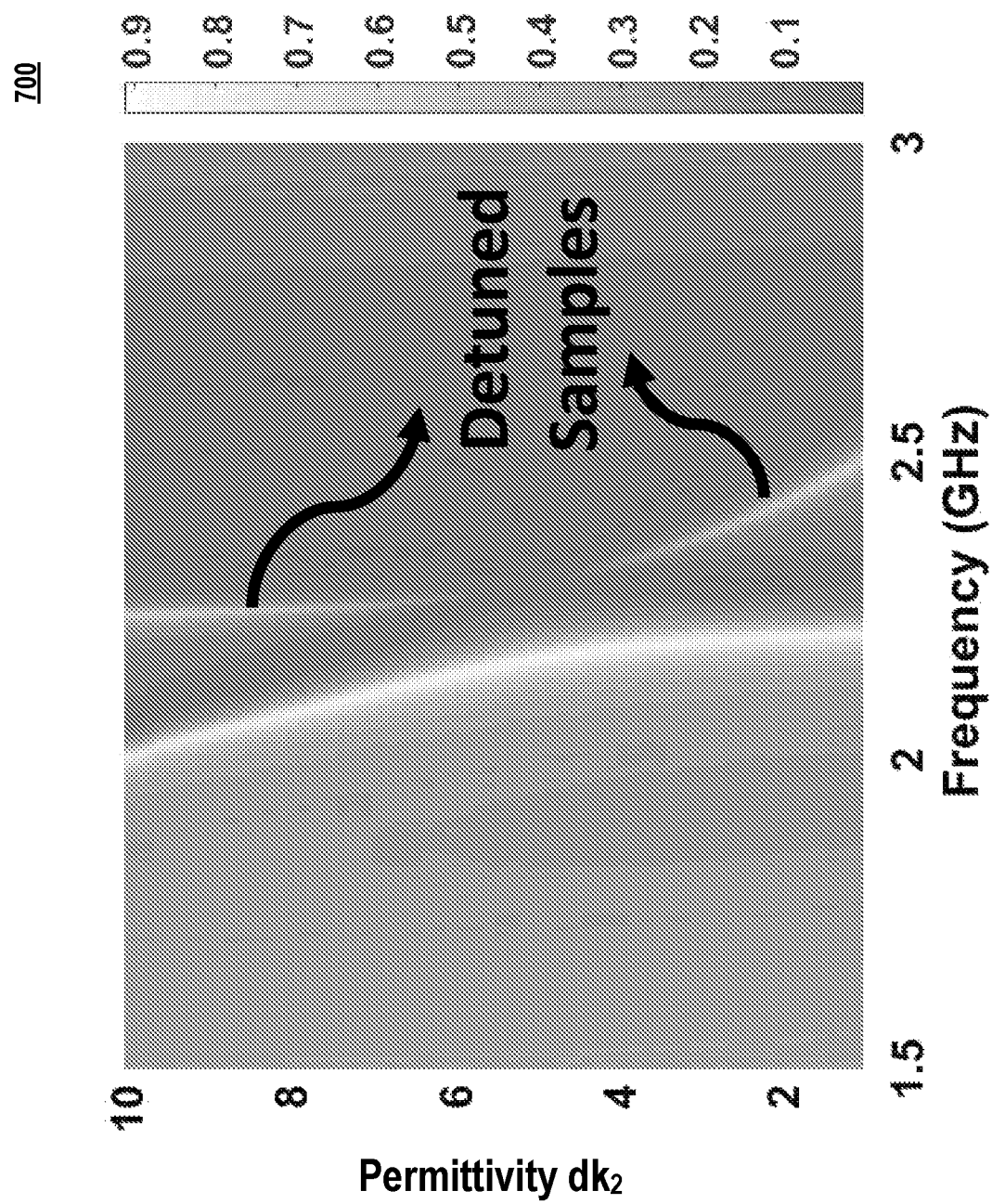
FIG. 7 illustrates simulation results for a transmitted field (S21) spectrum because of variations in Dk in one sample while another side has a sample with a known Dk of 5, in accordance with at least one embodiment.

FIG. 7 illustrates plot 700 showing simulation results for a transmitted field (S21) spectrum because of variations in Dk in one sample while another side has a sample with a known Dk of 5, in accordance with at least one embodiment. Here, high/low transmittance in dB is shown in white/black color scale, respectively. Plot 700 shows transmitted fields for a DDKS when a first sample is iteratively changed so that it has a varying Dk, while a second sample has a fixed Dk of 5. When both stub pairs (U-shaped resonator structures) are loaded with a sample that has a Dk of 5, matching between EIT spectrum results in getting a fully tuned EIT resonance. If Dk of one sample is different from 5, a strong split in EIT resonance band is observed, in accordance with at least one embodiment.

Figure 8:
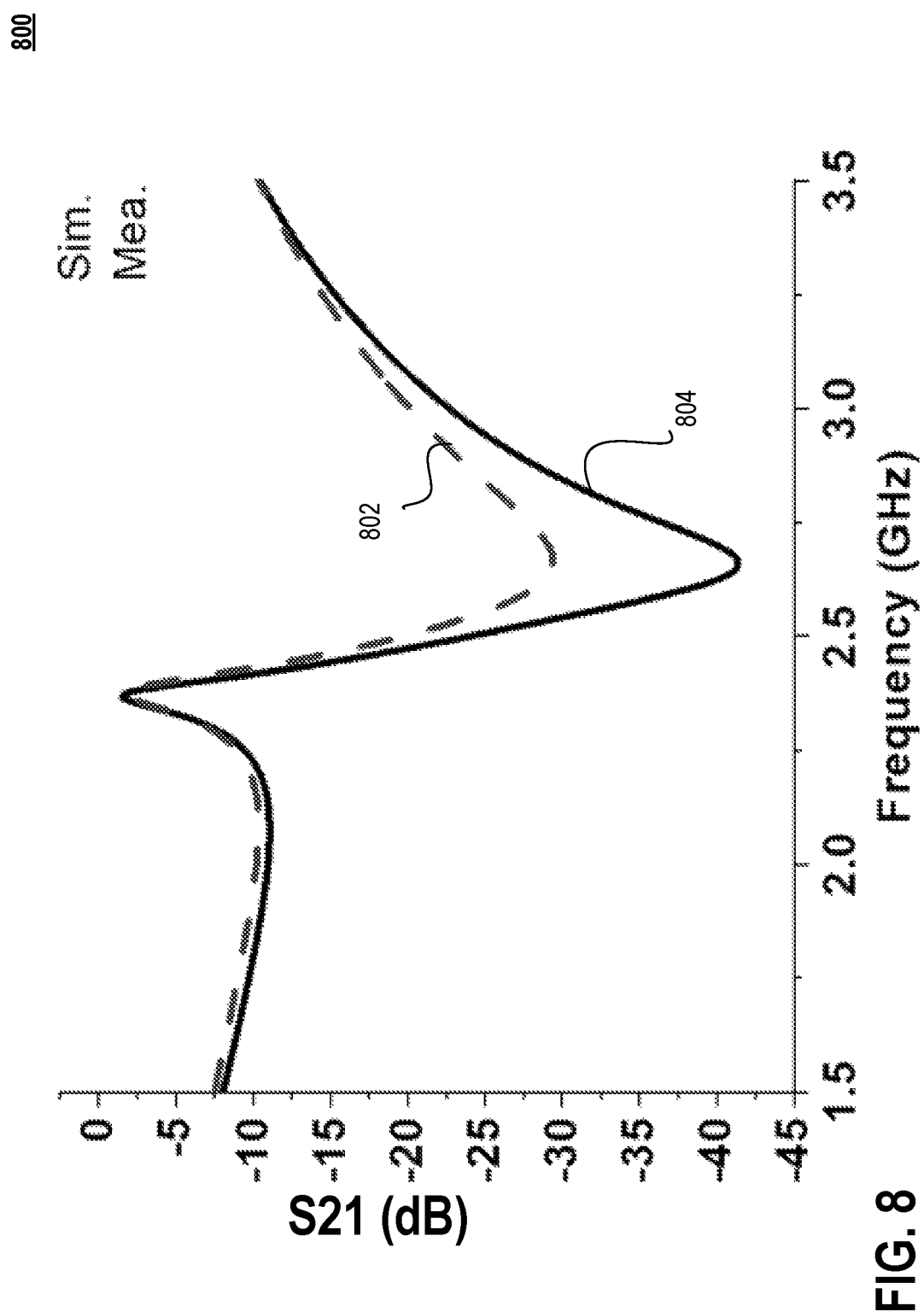
FIG. 8 illustrates a measured (dashed line) and simulated (solid line) output transmittance spectrum (S21) plot of a sensor when both samples are same, in accordance with at least one embodiment.

FIG. 8 illustrates plot 800 that shows a measured (dashed line) 802 and simulated (solid line) 804 output transmittance spectrum (S21) of a sensor when both samples are same, in accordance with at least one embodiment. In at least one embodiment, here resonance observed in this case is a fully tuned EIT band.

Figure 9:
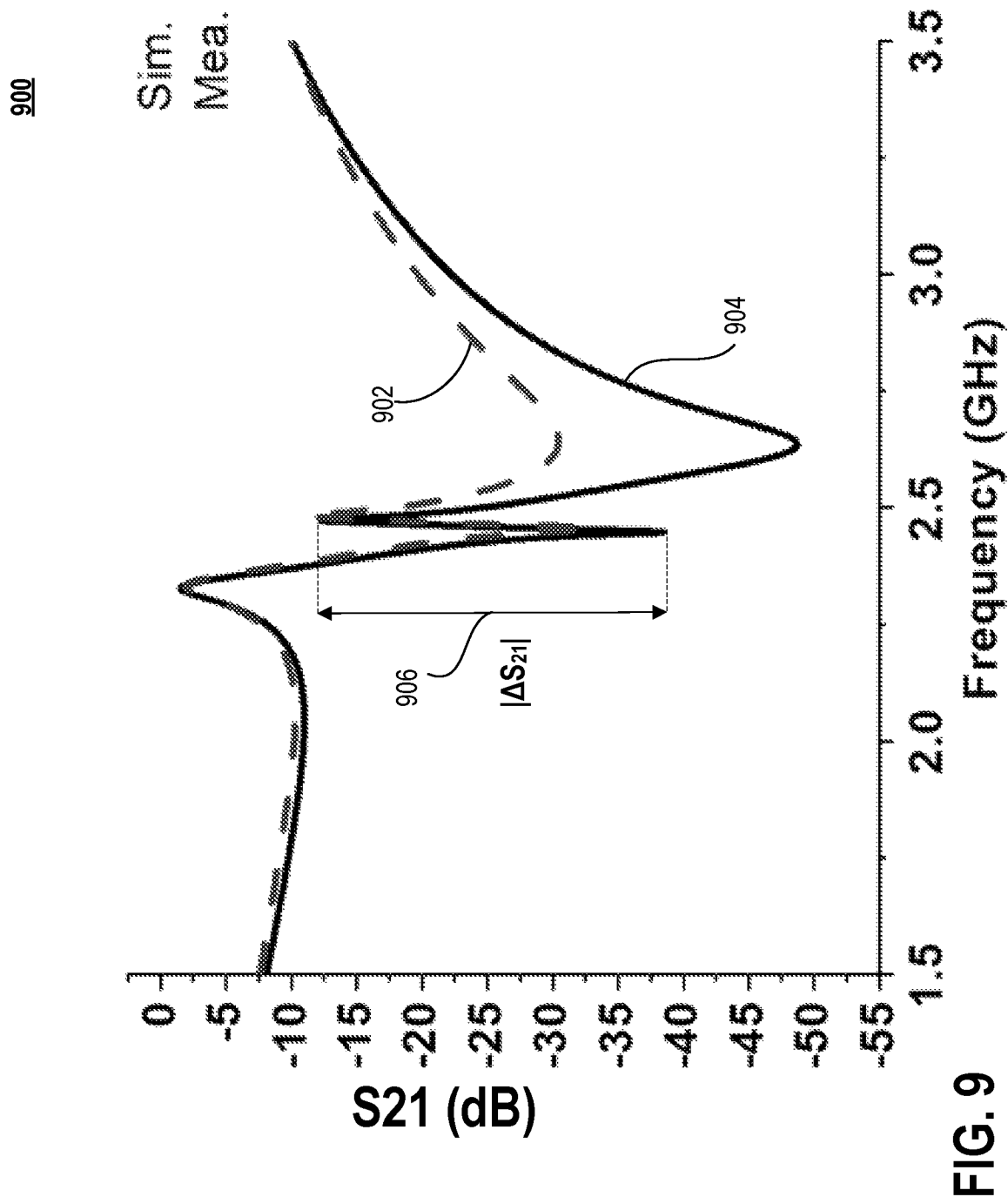
FIG. 9 illustrates a measured (dashed line) and a simulated (solid line) output transmittance (S21) plot of a DDKS when both samples are different, in accordance with at least one embodiment.

FIG. 9 illustrates plot 900 that shows a measured (dashed line) 902 and a simulated (solid line) 904 output transmittance (S21) of a DDKS when both samples are different, in accordance with at least one embodiment. Here, one sample has a higher Dk compared with another sample. In at least one embodiment, due to a destructive interference, a strong split within the EIT band is observed. In this case, DDKS gives a split in EIT resonance band that is evident from FIG. 9. $\Delta S_{21}$ 906 shows magnitude of an EIT split and it is proportional to a difference if Dk of both samples are different, according to at least one embodiment. In at least one embodiment, value of $\Delta S_{21}$ 906 may be be zero if Dk of both samples are same.

Figure 10:
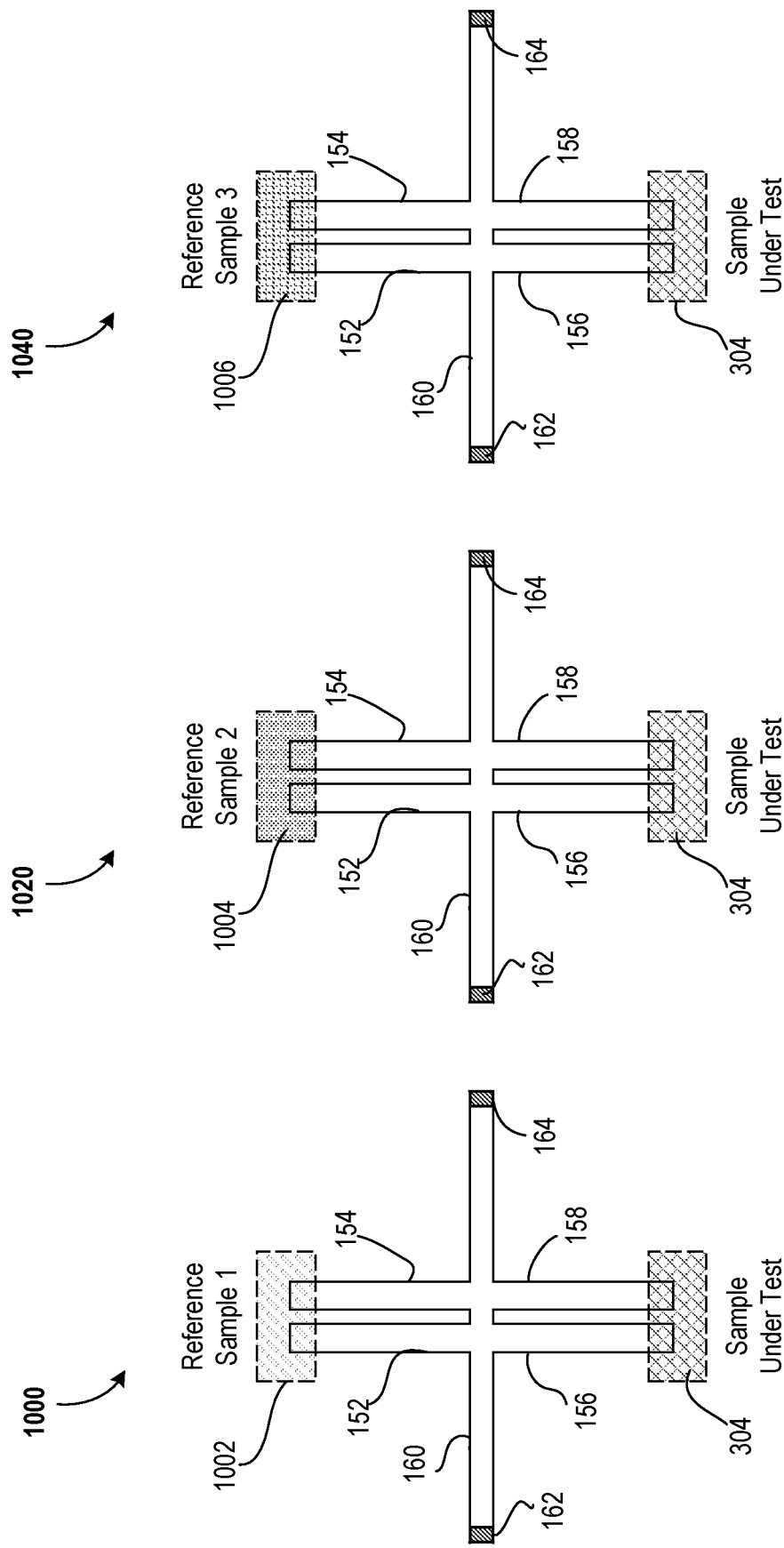
FIG. 10 illustrates three different reference samples with different Dks placed on open stubs of one U-shaped resonator, while SUT remains same, in accordance with at least one embodiment.

FIG. 10 illustrates three DDKS 1000, 1020, and 1040 with three different reference samples 1002, 1004, and 1006 with different Dks placed on open stubs of one U-shaped resonator, respectively, while SUT 304 remains same, in accordance with at least one embodiment. At least one embodiment estimates equivalent Dk of a SUT by comparing it with several reference samples having different Dk values. In at least one embodiment, Dk of sample 1002 is less than that of sample 1004 and that is less than that of sample 1006. Since DDKS is highly sensitive and can detect even smaller differences in Dks, a method of using a set of different reference samples is illustrated in FIG. 10, in accordance with at least one embodiment. In at least one embodiment, for a first instance, SUT 304 is compared with reference sample 1002, which has smallest Dk among all samples. In at least one embodiment, subsequently, SUT 304 is compared with sample 1004 and finally with sample 1006. As a result, in at least one embodiment, Dk of SUT 304 is, relatively speaking, significantly more accurately estimated. While FIG. 10 illustrates three reference samples, number of reference samples can be increased or decreased according to application use cases.

Figure 11:
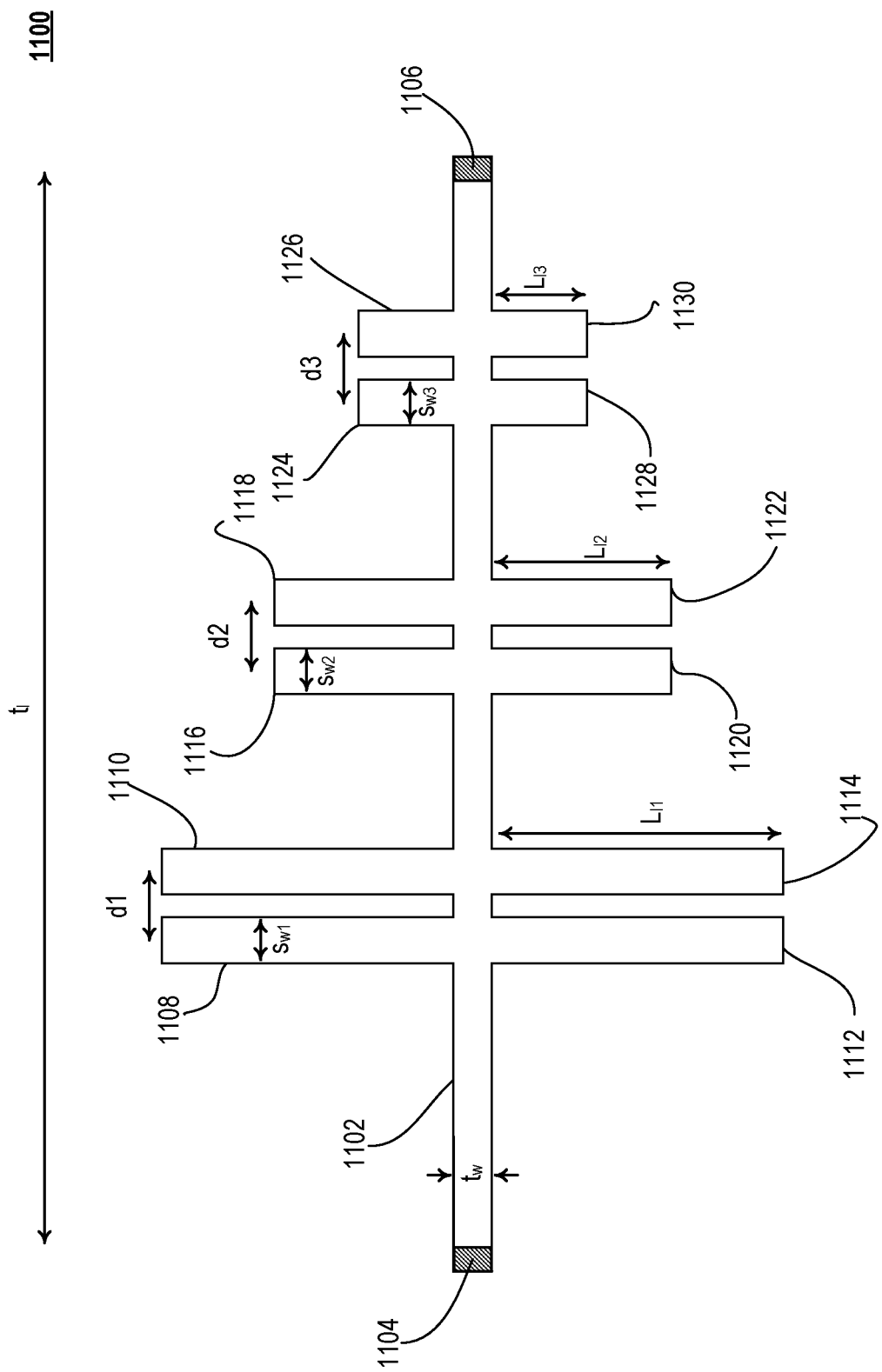
FIG. 11 illustrates a DDKS comprising of a transmission line with three sets of two U-shaped resonator structures, in accordance with at least one embodiment.

FIG. 11 illustrates DDKS 1100 comprising of transmission line 1102 with three sets of two U-shaped resonator structures, in accordance with at least one embodiment. In at least one embodiment, DDKS 1100 can compare Dk of a reference sample with that of SUT at three different frequencies. In at least one embodiment, an individual U-shaped resonator structures has four open stubs. In at least one embodiment, DDKS 1100 has two matched RF ports 1104 and 1106. In at least one embodiment, DDKS 1100 compares Dk of a reference sample and a SUT at three different operating frequencies. In at least one embodiment, a first operating frequency is determined by length $L_{l1}$ of longest stubs 1108, 1110, 1112, and 1114. In at least one embodiment, a second operating frequency is determined by length $L_{l2}$ of stubs 1116, 1118, 1120, and 1122. In at least one embodiment, a third operating frequency is determined by length $L_{l3}$ of stubs 1124, 1126, 1128, and 1130. In at least one embodiment, number of sets (three in this case) is not fixed and may be changed depending on the requirements of use cases. In at least one embodiment, glass containers used to hold samples as shown in FIGS. 4A-C and FIG. 5 are modified to hold three reference samples and three SUTs.

Figure 12:
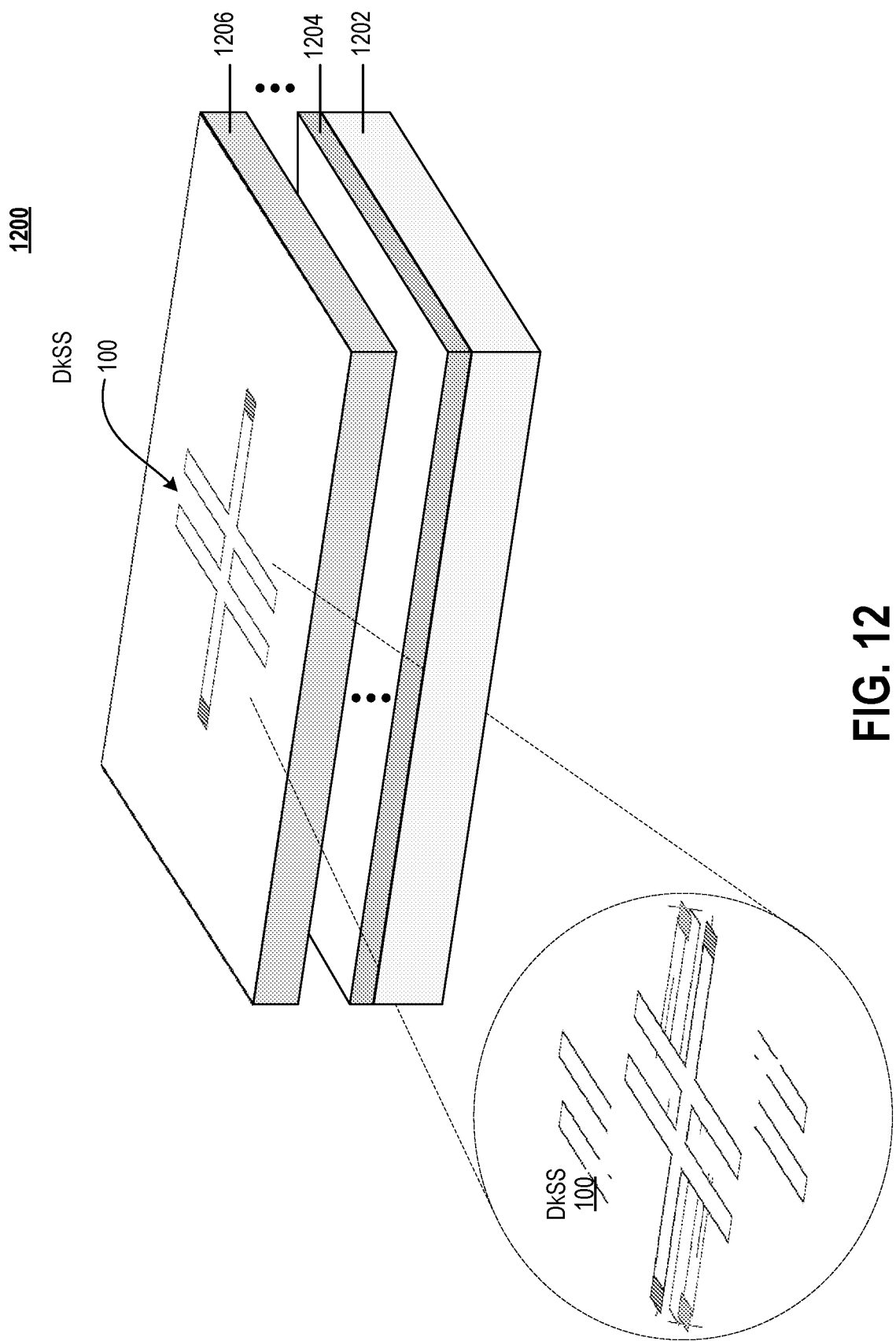
FIG. 12 illustrates disclosed sensor implemented on a chip for mm-Wave and THz sensing applications, in accordance with at least one embodiment.

FIG. 12 illustrates sensor structure 1200 implemented on a chip for mm-Wave and THz sensing applications, in accordance with at least one embodiment. In at least one embodiment, sensor structure 1200 can be reduced in size and implemented on metal layers of a microchip to operate at higher frequencies in mm-Wave band or THz band. In at least one embodiment, microchip has a silicon substrate layer 1202, first metal layer 1204, and a top metal layer 1206. As illustrated in FIG. 12, in at least one embodiment, silicon substrate layer 1202 may be thicker than first metal layer 1204, and thickness of metal layers increases towards top of microchip. In at least one embodiment, DDKS 100 may be implemented in top metal layer 1206. In at least one embodiment, on-chip implementation of DDkSS may make it low-power, low-cost and ultra-small; as a result, microliter of samples may suffice for sensing as well. In at least one embodiment, sensing electronics can be integrated on a chip that makes it viable to go for a lab-on-chip implementation.

Figure 13:
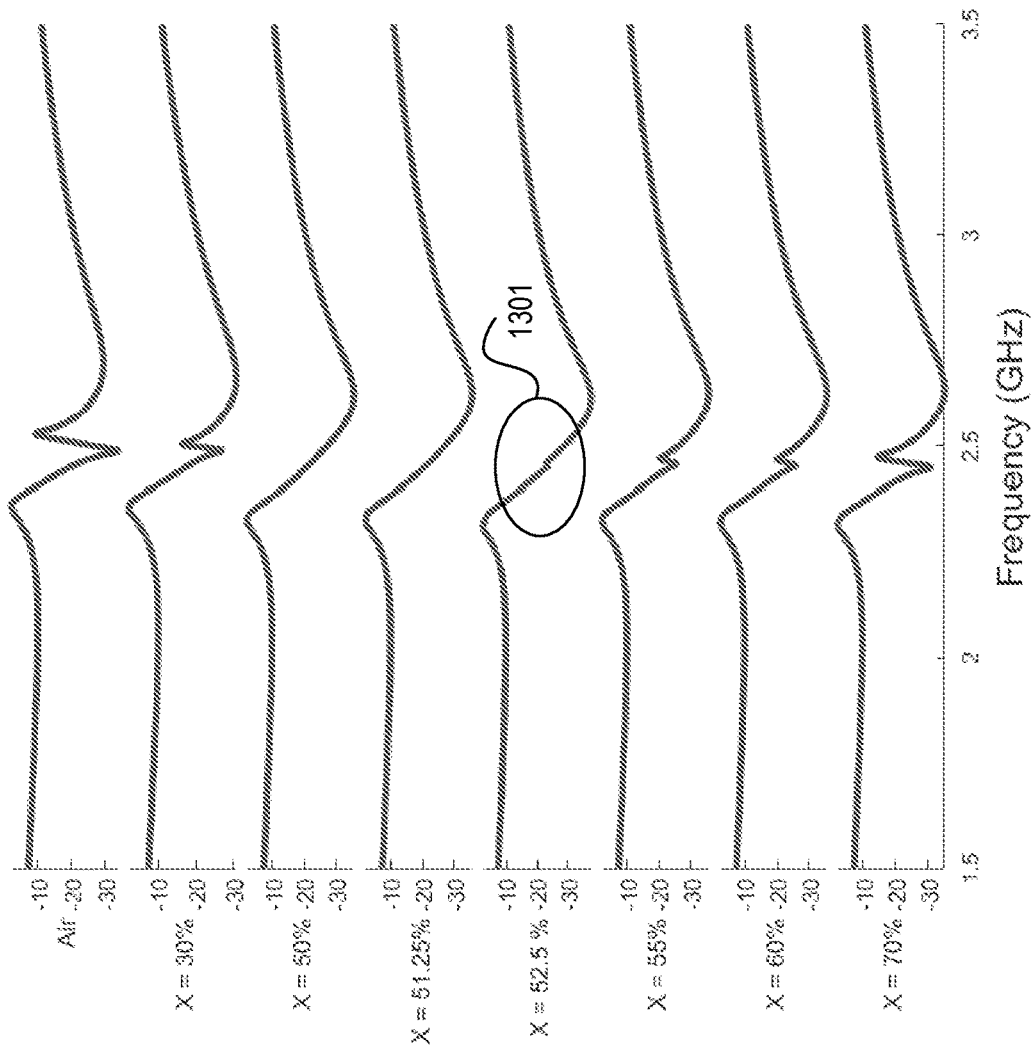
FIG. 13 illustrates a set of waveforms showing sensitivity of disclosed DDKS where minuscule quantity of different concentrations of ethanol samples in capillary tubes are compared by placing them at the opposite ends of U-shaped resonators, in accordance with at least one embodiment.

FIG. 13 illustrates a set of waveforms 1300 showing sensitivity of disclosed DDKS where minuscule quantity of different concentrations of ethanol samples in capillary tubes are compared by placing them at the opposite ends of U-shaped resonators, in accordance with at least one embodiment. Set of waveforms 1300 demonstrates strong EIT resonance when both samples have approximately same Dk and a strong split when they their Dks are significantly different. In at least one embodiment, set of waveforms 1300 shows that a difference of 2.5% (50% water and 50% ethanol is a reference sample and 52.5% ethanol and 47.5% water is SUT) between two samples gives rise to a split in EIT resonance band which may be visible and detected by a DDKS indicated by circle 1301. Set of waveforms 1300 shows that a DDKS has a high sensitivity and may be able to detect even minor infection biomarkers in blood, urine, or any other biological sample as infection biomarkers change Dk of a sample, in accordance with at least one embodiment.

Figure 14:
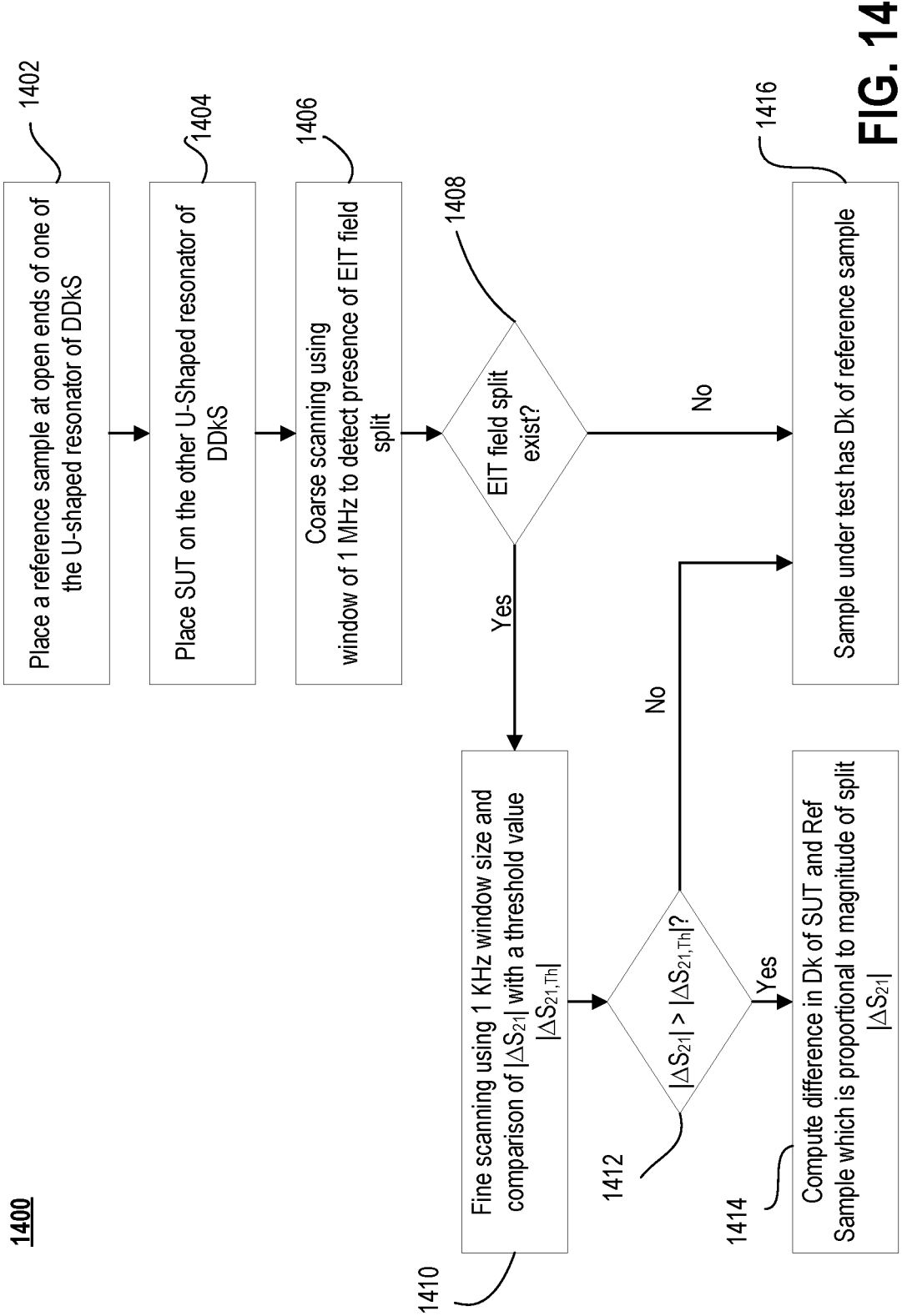
FIG. 14 illustrates a flowchart of a Dk sensing method that determines if Dk of a reference sample and a SUT are same (within a certain tolerance) or not, in accordance with at least one embodiment.

FIG. 14 illustrates flowchart 1400 of a Dk sensing method that determines if Dk of a reference sample and a SUT are same (within a certain tolerance) or not, in accordance with at least one embodiment. While blocks are shown in a particular order, order can be modifying. For example, some blocks may be performed before others and some blocks may be performed together or simultaneously. Blocks of flowchart 1400 may be performed by hardware, software, or a combination of them.

In at least one embodiment, magnitude of split in EIT resonance band is used to quantize difference of Dks of two samples placed at open ends of U-shaped resonators. In at least one embodiment, at block 1402, reference sample 302 is placed on a first of two U-shaped resonator structures of DDKS 300 mounted on top of stubs as shown in FIG. 3. In at least one embodiment, at block 1404, SUT 304 is placed on a second U-shaped resonator structure of DDKS 300. In at least one embodiment, both sides of U-shaped resonator structure are symmetrical, and therefore, DDKS 300 may not limit placement of reference sample 302 and SUT 304 on a specific side.

In at least one embodiment, at block 1406, presence or absence of a split in EIT resonance band is detected by coarse scanning EIT band with a frequency step size $\Delta f_{coar}$ (e.g., 1 MHz). In at least one embodiment, a large step size is used to reduce scanning time in bandwidth of interest (e.g., 1.5 GHz to 3.5 GHz). In at least one embodiment, step size of 1 MHz and frequency of interest 1.5 GHz to 3.5 GHz are example use cases and may be changed as needed. In at least one embodiment, at block 1408, if it is determined that an EIT split does not exist, then at block 1416 it is concluded that SUT 304 has approximately same Dk as that of reference sample 302. In at least one embodiment, if split is detected at block 1408, then next processing starts at block 1410. In at least one embodiment, magnitude and frequency at which split appears is quantized by fine scanning step of $\Delta f_{fine}$ (e.g., 10 KHz) at block 1410 and the magnitude of split $|\Delta S_{21}|$ is compared to a threshold value $|\Delta S2_{1,Th}|$.

In at least one embodiment, scanning window at block 1410 may be limited to that frequency window in which split is detected, and this significantly reduces a total scan time even with a smaller frequency step. In at least one embodiment, if magnitude of split lies within a threshold value $|\Delta S_{21,Th}|$ at block 1412, SUT 304 is considered to have an equivalent Dk constant as of reference sample 302 at block 1416. In at least one embodiment, if magnitude of split is greater than threshold value $|\Delta S_{21,Th}|$, magnitude of split $|\Delta S_{21}|$ may be computed at block 1414 which may be proportional to a difference in Dk of SUT 304 and of reference sample 302.

Figure 15:
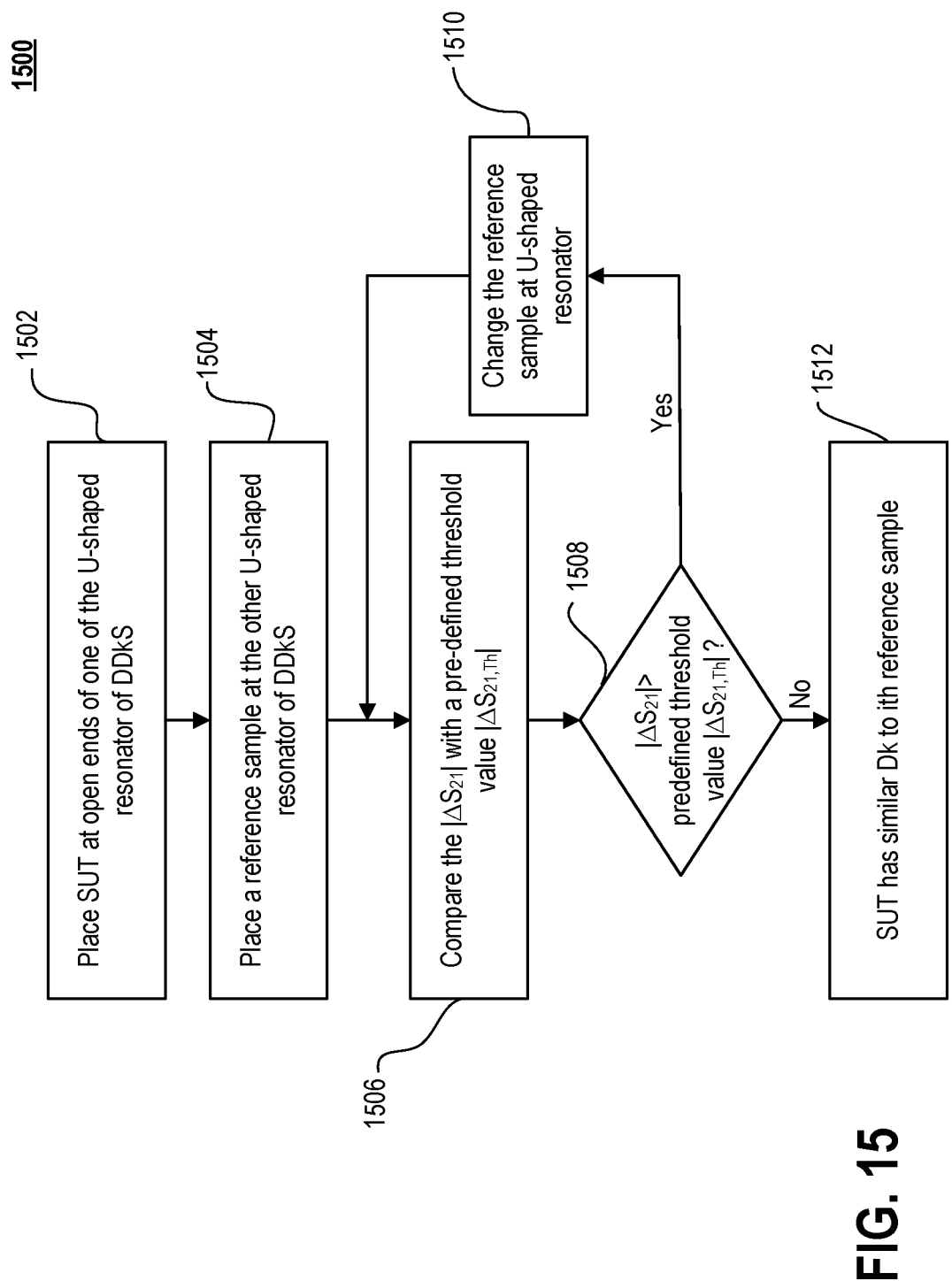
FIG. 15 illustrates the flowchart of a Dk sensing method of FIG. 10 to estimate a value of Dk of a SUT, in accordance with at least one embodiment.

In a use case where the Dk of a sample needs to be estimated as shown in an embodiment of FIG. 10, a flowgraph of a Dk sensing method is described in FIG. 15 to estimate Dk of SUT 304, in accordance with at least one embodiment. In at least one embodiment, value of Dk may be estimated by comparing SUT 304 with a set of reference samples 1002, 1004, 1006 with known Dks. This set may have any number of reference samples in accordance with at least one embodiment.

FIG. 15 illustrates flowchart 1500 of a Dk sensing method of FIG. 10 to estimate a value of Dk of a SUT, in accordance with at least one embodiment. While blocks are shown in a particular order, order can be modifying. For example, some blocks may be performed before others and some blocks may be performed together or simultaneously. Blocks of flowchart 1500 may be performed by hardware, software, or a combination of them.

In at least one embodiment, at block 1502, one reference sample from a set of three samples 1002, 1004, 1006 is placed on top of stubs of one of two U-shaped resonator structures of DDKS. In at least one embodiment, at block 1504, SUT 304 is placed on top of stubs of other U-shaped resonator structure. In at least one embodiment, at block 1506, split $\Delta S_{21}$ 906 is observed in EIT band of frequency spectrum of $S_{21}$ parameter. In at least one embodiment, magnitude of split may be a function of a difference in Dk values of SUT 304 and reference sample 1002. In at least one embodiment, if Dk of both samples are same within a pre-defined threshold value $S_{21,Th}$ at block 1508, DDKS gives a fully tuned EIT resonance; as a result, both samples have approximately same Dk as determined at block 1512. In at least one embodiment, if split $\Delta S_{21}$ 906 in EIT response is greater than a pre-defined threshold value $|\Delta S_{21,Th}|$ at block 1508, then a new reference sample is used at block 1510 and the magnitude $\Delta S_{21}$ 906 is compared with the threshold value $|\Delta S_{21,Th}|$ again at block 1506. In at least one embodiment, blocks 1506 and 1510 are iterated until split in EIT resonance band disappears. In at least one embodiment, Dk of SUT 304 may be approximately same as of that reference sample at which split in EIT resonance disappeared.

Here, "device" may generally refer to an apparatus according to context of usage of that term. In at least one embodiment, a device may refer to a stack of layers or structures, a single structure or layer, a connection of various structures having active and/or passive elements, etc. Generally, a device is a three-dimensional structure with a plane along x-y direction and a height along z direction of an x-y-z Cartesian coordinate system. In at least one embodiment, plane of device may also be plane of an apparatus, which comprises device.

Throughout specification, and in claims, "connected" may generally refer to a direct connection, such as electrical, mechanical, or magnetic connection between things that are connected, without any intermediary devices.

Here, "coupled" may generally refer to a direct or indirect connection, such as a direct electrical, mechanical, or magnetic connection between things that are connected or an indirect connection, through one or more passive or active intermediary devices.

Here, "adjacent" may generally refer to a position of a thing being next to (e.g., immediately next to or close to with one or more things between them) or adjoining another thing (e.g., abutting it).

Here, "circuit" or "module" may generally refer to one or more passive and/or active components that are arranged to cooperate with one another to provide a desired function.

Here, "signal" may generally refer to at least one current signal, voltage signal, magnetic signal, or data/clock signal. Here, meaning of "a," "an," and "the" include plural references. Here, meaning of "in" includes "in" and "on."

Here, "analog signal" generally refers to any continuous signal for which time varying feature (variable) of signal is a representation of some other time varying quantity, e.g., analogous to another time varying signal.

Here, "digital signal" may generally refer to a physical signal that is a representation of a sequence of discrete values (a quantified discrete-time signal), for example of an arbitrary bit stream, or of a digitized (sampled and analog-to-digital converted) analog signal.

Here, "scaling" may generally refer to converting a design (schematic and layout) from one process technology to another process technology and subsequently being reduced in layout area. Here, "scaling" may generally refer to down-sizing layout and devices within same technology node. Here, "scaling" may also generally refer to adjusting (e.g., slowing down or speeding up—e.g., scaling down, or scaling up respectively) of a signal frequency relative to another parameter, for example, power supply level.

Here, terms "substantially," "close," "approximately," "near," and "about," generally refer to being within +/−10% of a target value. For example, unless otherwise specified in explicit context of their use, terms "substantially equal," "about equal" and "approximately equal" mean that there is no more than incidental variation between among things so described. In at least one embodiment, such variation is typically no more than +/−10% of a predetermined target value.

Unless otherwise specified use of ordinal adjectives "first," "second," and "third," etc., to describe a common object, merely indicate that different instances of like objects are being referred to and are not intended to imply that objects so described must be in a given sequence, either temporally, spatially, in ranking or in any other manner.

For purposes of present disclosure, phrases "A and/or B" and "A or B" mean (A), (B), or (A and B). In at least one embodiment, phrase "A, B, and/or C" means (A), (B), (C), (A and B), (A and C), (B and C), or (A, B and C).

Here, "left," "right," "front," "back," "top," "bottom," "over," "under," and like in description and in claims, if any, are used for descriptive purposes and not necessarily for describing permanent relative positions. In at least one embodiment, "over," "under," "front side," "back side," "top," "bottom," "over," "under," and "on" as used herein refer to a relative position of one component, structure, or material with respect to other referenced components, structures or materials within a device, where such physical relationships are noteworthy. In at least one embodiment, these terms are employed herein for descriptive purposes only and predominantly within context of a device z-axis and therefore may be relative to an orientation of a device. In at least one embodiment, a first material "over" a second material in context of a figure provided herein may also be "under" second material if device is oriented upside-down relative to context of figure provided. In context of materials, one material disposed over or under another may be directly in contact or may have one or more intervening materials. Moreover, one material disposed between two materials may be directly in contact with two layers or may have one or more intervening layers. In at least one embodiment, a first material "on" a second material is in direct contact with that second material. Similar distinctions are to be made in context of component assemblies.

Here, "between" may be employed in context of z-axis, x-axis, or y-axis of a device. In at least one embodiment, a material that is between two other materials may be in contact with one or both of those materials, or it may be separated from both of other two materials by one or more intervening materials. In at least one embodiment, a material "between" two other materials may therefore be in contact with either of other two materials, or it may be coupled to other two materials through an intervening material. In at least one embodiment, a device that is between two other devices may be directly connected to one or both of those devices, or it may be separated from both of other two devices by one or more intervening devices.

Reference in specification to "an embodiment," "one embodiment," "in at least one embodiment," "some embodiments," or "other embodiments" means that a particular feature, structure, or characteristic described in connection with embodiments is included in at least some embodiments, but not necessarily all embodiments. Various appearances of "an embodiment," "one embodiment," "in at least one embodiment," or "some embodiments" are not necessarily all referring to same embodiments. If specification states a component, feature, structure, or characteristic "may," "might," or "could" be included, that particular component, feature, structure, or characteristic is not required to be included. If specification or claim refers to "a" or "an" element, that does not mean there is only one of elements. If specification or claims refer to "an additional" element, that does not preclude there being more than one of additional elements.

Furthermore, particular features, structures, functions, or characteristics may be combined in any suitable manner in one or more embodiments. For example, a first embodiment may be combined with a second embodiment anywhere particular features, structures, functions, or characteristics associated with two embodiments are not mutually exclusive.

While at least one embodiment has been described in conjunction with specific embodiments thereof, many alternatives, modifications and variations of such embodiments will be apparent to those of ordinary skill in the art considering description herein. At least one embodiment is intended to embrace all such alternatives, modifications, and variations as to fall within broad scope of appended claims.

In addition, well-known power/ground connections to integrated circuit (IC) chips and other components may or may not be shown within presented figures, for simplicity of illustration and discussion, and so as not to obscure any embodiment. Further, arrangements may be shown in block diagram form to avoid obscuring any embodiment, and in view of the fact that specifics with respect to implementation of such block diagram arrangements are highly dependent upon the platform within which an embodiment is to be implemented (e.g., such specifics should be well within purview of one skilled in art). Where specific details (e.g., circuits) are set forth to describe example embodiments of disclosure, it should be apparent to one skilled in art that disclosure can be practiced without, or with variation of, these specific details. Description of an embodiment is thus to be regarded as illustrative instead of limiting.

In at least one embodiment, structures described herein can also be described as method(s) of forming those structures or apparatuses, and method(s) of operation of these structures or apparatuses. Following examples are provided that illustrate at least one embodiment. An example can be combined with any other example. As such, at least one embodiment can be combined with at least another embodiment without changing scope of an embodiment.

Example 1: An apparatus comprising: a Differential Dielectric Constant Sensor (DDKS) having two U-shaped resonator structures making a EIT comparator for use in detecting infectious diseases, other biomedical and material sensing applications, which involve sensing differential Dks of two samples, comprising: a rectangular-shaped microstrip transmission line; two U-shaped resonators wherein each one of them consists of two symmetric and rectangular-shaped body sections with equal width and length; wherein two U-shaped resonators are connected in a perpendicular position relative to a rectangular-shaped microstrip transmission line; and both U-shaped resonators are placed in a middle of a microstrip transmission line and also are in a mirror position relative to a rectangular-shaped microstrip transmission line. In at least one embodiment, one sample namely a reference sample is placed at an open stubs of one U-shaped resonator; a second sample namely a sample under test (SUT) is placed at an open stubs of a second U-shaped resonator; two samples experience an Electric field, generated by U-shaped resonators, of a maximum value at an open stubs of U-shaped resonators; wherein an EIT resonance is generated whenever two samples are placed at open stubs of U-shaped resonators that have a same Dks; moreover, a EIT resonance field splits into two resonance fields because of differential sensing whenever the Dks of two samples placed at open stubs of U-shaped resonators have different Dks; and whereas, U-shaped resonator based EIT comparator apparatus does not require calibration.

Example 2: The U-shaped EIT based DDKS of example 1 is capable of differential sensing of miniscule quantities of liquid samples of the order of a few microliters within microfluidic channels.

Example 3: The U-shaped EIT based DDKS of example 1 is capable of differential sensing of solid and semi-solid samples of different size and volume which can cover open stubs of a U-shaped comparator.

Example 4: The U-shaped EIT based DDKS of example 1 has a non-linear sensitivity to small changes in Dks and this feature enables U-shaped comparator apparatus to be used in any type of differential Dk sensing applications.

Example 5: The U-shaped EIT based DDKS of example 1 can detect infection biomarkers of viral or bacterial infectious diseases that produce even a small change in Dks of biological fluidic samples such as blood, urine, saliva, etc., or any other such materials by applying the method of differential sensing on two samples wherein one sample does not contain any infections namely a reference sample, and a second sample contains infections namely a sample under test.

Example 6: The U-shaped EIT based DDKS of example 1 can be implemented on a printed circuit board and it can operate at a desired operating frequency range by changing the dimensions or geometry of a U-shaped comparator structure and transmission lines.

Example 7: The U-shaped EIT based DDKS of example 1 is capable of differential sensing of miniscule quantities of solid, semi-solid, and liquid samples at a single frequency and can be implemented on a printed circuit board in a desired frequency range by changing the dimensions of the geometry of the U-shaped comparator structures and transmission lines.

Example 8: The U-shaped EIT based DDKS of example 1 can be implemented on an Integrated Circuit (IC) using CMOS, BiCMOS or another appropriate IC technology and it can operate in mm-wave or terahertz frequency range, as the dimensions of the geometry of U-shaped comparator structures and transmission lines are significantly reduced.

Example 9: The U-shaped EIT based DDKS of example 1 works with samples contained in: a liquid thin glass container; or a plastic container such as a capillary tube; or any other microfluidic channel; or in a container that is made out of glass or plastic or any other material, containing cavities, and placed on both open stubs of a U-shaped resonator; or specifically built retaining walls around both stubs of an U-shaped resonator and then samples are dropped on both ends of a U-shaped resonator for utilizing the method of differential sensing.

Example 10: A DDKS having six U-shaped resonator structures making three EIT comparators for use in detecting infectious diseases, other biomedical and material sensing applications, which involve sensing differential Dks of two samples, comprising: a rectangular-shaped microstrip transmission line; three groups of U-shaped resonators wherein each group consists of two U-shaped resonators and each one of them consists of two symmetric and rectangular-shaped body sections with an equal width and length; whereas the width and length of two symmetric and rectangular-shaped body sections in each group of a U-shaped resonator are different from other two groups; moreover, the length of two symmetric and rectangular-shaped body sections in each subsequent group of a U-shaped resonator, as the signal propagates in the transmission line, might be decreasing or increasing in any selected order; wherein two U-shaped resonators of each group are connected in a perpendicular position relative to a rectangular-shaped microstrip transmission line.

Example 11: The U-shaped EIT based DDKS of example 10 is capable of differential sensing of miniscule quantities of solid, semi-solid and liquid samples at three different frequencies.

Example 12: The U-shaped EIT based DDKS of example 10 is easily scalable to N comparators that are capable of differential sensing of miniscule quantities of solid, semi-solid, and liquid samples at three different frequencies at N different frequencies resulting in precisely estimating the Dk of a material.

Example 13: The U-shaped EIT based DDKS of example 10 can be implemented on a printed circuit board in a desired frequency range by changing the dimensions of the geometry of the U-shaped comparator structures and transmission lines.

Example 14: The U-shaped EIT based DDKS of example 10 can be implemented on an Integrated Circuit (IC) using CMOS, BiCMOS or another appropriate IC technology and it can operate in mm-wave or terahertz frequency range, as the dimensions of the geometry of U-shaped comparator structures and transmission lines are significantly reduced.

Example 15: A DDkSS based method of classifying whether a reference sample and SUT are the same or not comprising of: deploying a reference sample and a SUT on open stubs of two U-shaped resonators; mixing the output of a Dk sensor with an oscillator frequency in the desired band and then filtering the down converted output using an Image Response (IR) filter; collecting data from the output of an analog to digital converter and processing it inside a digital signal processing unit; executing mathematical methods on a processor to preprocess and filter the output of an analog to digital converter and storing the output in a volatile on board memory; executing a Dk sensing method by doing coarse scanning to detect an EIT split in a transmittance signal; and doing fine scanning to quantize the magnitude of an EIT split when it exists; determining if magnitude of EIT split is greater than a predefined threshold, then making an inference that Dk of a reference sample and SUT have different Dks; determining if magnitude of EIT split is less than a predefined threshold or if an EIT split is not detected, then a reference sample and SUT have the same or equivalent Dks, where if one sample contains biomarker of an infectious disease and a reference sample is disease free, then EIT split is observed and magnitude of EIT split is higher than a predetermined value, consequently, a disease is detected in real time.

Example 16: A method of characterizing a material with reference materials of known Dks comprising of: deploying first reference sample and a SUT on open stubs of two U-shaped resonators; mixing output of Dk sensor with an oscillator frequency in the desired band and then filtering the down converted output using an Image Response (IR) filter; collecting data from the output of an analog to digital converter and processing it inside a digital signal processing unit; executing mathematical methods on a processor to preprocess and filter the output of analog to digital converter and storing the output in a volatile on board memory; executing a Dk sensing method by comparing the magnitude of an EIT split in a transmittance signal with a predefined threshold, and if it is greater than a predefined threshold, then change the reference sample, as materials of both samples are not the same; iteratively keep changing the reference sample until the magnitude of an EIT split becomes smaller compared with a predefined threshold.

Example 17: The method of example 16, where a Dk of an unknown material can be estimated by iteratively comparing it with that of reference samples of known Dks and stopping only when the magnitude of an EIT split in transmittance signal is less than a predefined threshold.

Example 1a: An apparatus comprising: a rectangular-shaped microstrip transmission line; two U-shaped resonators coupled in a perpendicular position relative to the rectangular-shaped microstrip transmission line, wherein an individual one of the two U-shaped resonators comprises two symmetric and rectangular-shaped body sections with substantially equal width and length, wherein the two U-shaped resonators are placed substantially in a middle of a microstrip transmission line and also are in a mirror position relative to the rectangular-shaped microstrip transmission line; a first region for a reference sample, wherein the first region is coupled to first open stubs of a first U-shaped resonator of the two U-shaped resonators; and a second region for a sample-under-test, wherein the second region is coupled to second open stubs of a second U-shaped resonator of the two U-shaped resonators.

Example 2a: The apparatus of example 1a, wherein the two U-shaped resonators are to generate an electric field at the first open stubs and the second open stubs.

Example 3a: The apparatus of example 1a, wherein the two U-shaped resonators generate an electromagnetically induced transparency when the reference sample and the sample-under-test have same dielectric constants.

Example 4a: The apparatus of example 1a, wherein the two U-shaped resonators split electromagnetically induced transparency based resonance field into two fields when the reference sample and the sample-under-test have different dielectric constants.

Example 5a: The apparatus of example 1a, wherein the two U-shaped resonators are independent of calibration.

Example 6a: The apparatus of example 1a, wherein the two U-shaped resonators are to differentially sense the reference sample and the sample-under-test.

Example 7a: The apparatus of example 1a, wherein the reference sample and the sample-under-test are one of: solid, semi-solid, or liquid.

Example 8a: The apparatus of example 1a, wherein the two U-shaped resonators have a non-linear sensitivity to changes in dielectric constant of the sample-under-test.

Example 9a: The apparatus of example 1a, wherein the rectangular-shaped microstrip transmission line and the two U-shaped resonators are on a printed circuit board.

Example 10a: The apparatus of example 1a, wherein the first region or the second region include one of: a liquid thin glass container; a plastic container; a capillary tube; a microfluidic channel; a glass or plastic container with cavities; or retaining walls around the first open stubs or the second open stubs.

Example 11a: The apparatus of example 1a comprising a mixer coupled to the rectangular-shaped microstrip transmission line.

Example 12a: The apparatus of example 11a comprising: a first frequency synthesizer coupled to the mixer; and a second frequency synthesizer coupled to the rectangular-shaped microstrip transmission line.

Example 13a: The apparatus of example 11a comprising: an IR filter coupled to an output of the mixer; an analog-to-digital converter coupled to an output of the IR filter; and a processing module coupled to an output of the analog-to-digital converter.

Example 14a: A method comprising: deploying a reference sample on a first open stub of a first U-shaped resonator; deploying a sample-under-test on a second open stub of second U-shaped resonator coupled to the first U-shaped resonator, wherein the first U-shaped resonator and the second U-shaped resonator provide a first output via a transmission line; mixing the first output with an oscillator frequency to generate a second output; filtering the second output to generate an analog output; converting the analog output to a digital output; and analyzing the digital output to determine whether a first dielectric constant of the reference sample is same as a second dielectric constant of the sample-under-test.

Example 15a: The method of example 14a, wherein analyzing the digital output comprises: determining whether electromagnetically induced transparency based resonance field from the transmission line is split into two fields; and notifying that the reference sample and the sample-under-test have different dielectric constants if the electromagnetically induced transparency based resonance field from the transmission line is split into two fields.

Example 16a: The method of example 14a, wherein analyzing the digital output comprises: determining whether electromagnetically induced transparency based resonance field from the transmission line is split into two fields; determining a magnitude of the split; comparing the magnitude of the split with a threshold; and determining whether the reference sample and the sample-under-test have different dielectric constants based on the comparing.

Example 17a: The method of example 16a, wherein determining whether the reference sample and the sample under test have different dielectric constants comprises: determining whether the magnitude of the split is less than the threshold; and notifying that the reference sample and the sample-under-test have same dielectric constants if the magnitude of the split is less than the threshold.

Example 18a: The method of example 16a, wherein determining whether the reference sample and the sample-under-test have different dielectric constants comprises: determining whether the magnitude of the split is greater than the threshold; and notifying that the reference sample and the sample-under-test have different dielectric constants if the magnitude of the split is greater than the threshold.

Example 19a: A method of characterizing a material with reference materials of known dielectric constants, the method comprising of: deploying a reference sample and a sample-under-test on open stubs of two U-shaped resonators; mixing a first output of the two U-shaped resonators with an oscillator frequency to generate a second output; filtering the second output with an image response filter; converting a third output of the image response filter to a digital representation; and processing the digital representation to determine whether dielectric constants of the reference sample and the sample-under-test are same based on a comparison of a magnitude of split, of electromagnetically induced transparency based resonance field from the two U-shaped resonators, with a threshold.

Example 20a: The method of example 19a comprising modifying the reference sample until the magnitude of the split is less than the threshold.

An abstract is provided that will allow reader to ascertain nature and gist of technical disclosure. Abstract is submitted with an understanding that it will not be used to limit scope or meaning of claims. Following claims are hereby incorporated into detailed description, with each claim standing on its own as a separate embodiment.

We claim:

1. An apparatus comprising:
   a transmission line comprising a rectangular-shaped microstrip;
   two U-shaped resonators coupled in a perpendicular position relative to the transmission line, wherein an individual one of the two U-shaped resonators comprises two symmetric and rectangular-shaped body sections with substantially equal width and length, wherein the two U-shaped resonators are placed substantially in a middle of the transmission line and also are in a mirror position relative to the transmission line;
   a first region for a reference sample, wherein the first region is coupled to first open stubs of a first U-shaped resonator of the two U-shaped resonators; and
   a second region for a sample-under-test, wherein the second region is coupled to second open stubs of a second U-shaped resonator of the two U-shaped resonators.

2. The apparatus of claim 1, wherein the two U-shaped resonators are to generate an electric field at the first open stubs and the second open stubs.

3. The apparatus of claim 1, wherein the two U-shaped resonators generate an electromagnetically induced transparency when the reference sample and the sample-under-test have same dielectric constants.

4. The apparatus of claim 1, wherein the two U-shaped resonators split electromagnetically induced transparency based resonance field into two fields when the reference sample and the sample-under-test have different dielectric constants.

5. The apparatus of claim 1, wherein the two U-shaped resonators are independent of calibration.

6. The apparatus of claim 1, wherein the two U-shaped resonators are to differentially sense the reference sample and the sample-under-test.

7. The apparatus of claim 1, wherein the reference sample and the sample-under-test are one of: solid, semi-solid, or liquid.

8. The apparatus of claim 1, wherein the two U-shaped resonators have a non-linear sensitivity to changes in dielectric constant of the sample-under-test.

9. The apparatus of claim 1, wherein the rectangular-shaped microstrip and the two U-shaped resonators are on a printed circuit board.

10. The apparatus of claim 1, wherein the first region or the second region include one of:
    a liquid thin glass container;
    a plastic container;
    a capillary tube;
    a microfluidic channel;
    a glass or plastic container with cavities; or
    retaining walls around the first open stubs or the second open stubs.

11. The apparatus of claim 1 comprising a mixer coupled to the transmission line.

12. The apparatus of claim 11 comprising:
    a first frequency synthesizer coupled to the mixer; and
    a second frequency synthesizer coupled to the transmission line.

13. The apparatus of claim 11 comprising:
    an IR filter coupled to an output of the mixer;
    an analog-to-digital converter coupled to an output of the IR filter; and
    a processing module coupled to an output of the analog-to-digital converter.

14. A method comprising:
    deploying a reference sample on a first open stub of a first U-shaped resonator;
    deploying a sample-under-test on a second open stub of second U-shaped resonator coupled to the first U-shaped resonator, wherein the first U-shaped resonator and the second U-shaped resonator provide a first output via a transmission line;
    mixing the first output with an oscillator frequency to generate a second output;
    filtering the second output to generate an analog output;
    converting the analog output to a digital output; and
    analyzing the digital output to determine whether a first dielectric constant of the reference sample is same as a second dielectric constant of the sample-under-test.

15. The method of claim 14, wherein analyzing the digital output comprises:
    determining whether electromagnetically induced transparency based resonance field from the transmission line is split into two fields; and
    notifying that the reference sample and the sample-under-test have different dielectric constants if the electromagnetically induced transparency based resonance field from the transmission line is split into two fields.

16. The method of claim 14, wherein analyzing the digital output comprises:
    determining whether electromagnetically induced transparency based resonance field from the transmission line is split into two fields;
    determining a magnitude of split of the two fields;
    comparing the magnitude of the split with a threshold; and
    determining whether the reference sample and the sample-under-test have different dielectric constants based on the magnitude.

17. The method of claim 16, wherein determining whether the reference sample and sample under test have different dielectric constants comprises:
    determining whether the magnitude of the split is less than the threshold; and notifying that the reference sample and the sample-under-test have same dielectric constants if the magnitude of the split is less than the threshold.

18. The method of claim 16, wherein determining whether the reference sample and the sample-under-test have different dielectric constants comprises:
   determining whether the magnitude of the split is greater than the threshold; and
   notifying that the reference sample and the sample-under-test have different dielectric constants if the magnitude of the split is greater than the threshold.

19. A method of characterizing a material with reference materials of known dielectric constants, the method comprising of:
   deploying a reference sample and a sample-under-test on open stubs of two U-shaped resonators;
   mixing a first output of the two U-shaped resonators with a signal from an frequency oscillator to generate a second output;
   filtering the second output with an image response filter;
   converting a third output of the image response filter to a digital representation; and
   processing the digital representation to determine whether dielectric constants of the reference sample and the sample-under-test are same based on a comparison of a magnitude of split, of electromagnetically induced transparency based resonance field from the two U-shaped resonators, with a threshold.

20. The method of claim 19 comprising:
modifying the reference sample until the magnitude of the split is less than the threshold.

* * * * *